US012795266B2

(12) United States Patent
Castro et al.

(10) Patent No.: US 12,795,266 B2
(45) Date of Patent: Nov. 10, 2026

(54) FABRIC MODULES FOR HIGH-RADIX NETWORKS

(71) Applicant: Panduit Corp., Tinley Park, IL (US)

(72) Inventors: Jose M. Castro, Naperville, IL (US); Richard J. Pimpinella, Prairieville, LA (US); Bulent Kose, Burr Ridge, IL (US); Yu Huang, Orland Park, IL (US)

(73) Assignee: Panduit Corp., Tinley Park, IL (US)

( * ) Notice: Subject to any disclaimer, the term of this patent is extended or adjusted under 35 U.S.C. 154(b) by 334 days.

(21) Appl. No.: 17/989,231

(22) Filed: Nov. 17, 2022

(65) Prior Publication Data

US 2024/0171886 A1 May 23, 2024

(51) Int. Cl.
*H04Q 11/00* (2006.01)

(52) U.S. Cl.
CPC ..... *H04Q 11/0005* (2013.01); *H04Q 11/0062* (2013.01); *H04Q 2011/0043* (2013.01); *H04Q 2011/0056* (2013.01); *H04Q 2011/0081* (2013.01)

(58) Field of Classification Search
CPC ........................ H04Q 11/0005; H04Q 11/0062
See application file for complete search history.

(56) References Cited

U.S. PATENT DOCUMENTS 7,756,371 B1 * 7/2010 Burnham ............. G02B 6/4472 398/55
9,008,510 B1 * 4/2015 Zhao ................... H04L 49/1515 398/19
9,154,860 B2 10/2015 Hessong et al.
2002/0021956 A1 * 2/2002 Winkler ............... B65G 1/1375 414/349
2015/0230007 A1 8/2015 Hessong et al.
2017/0041691 A1 * 2/2017 Rickman ............ H04Q 11/0071
2021/0033795 A1 * 2/2021 Lohmann ........... H04Q 11/0005

FOREIGN PATENT DOCUMENTS

EP 3796058 A1 9/2020

OTHER PUBLICATIONS

Adel A M Saleh, et al.: "Elastic WDM Switching for Scalable Data Center and HPC Interconnect Networks", 2016 21st Optoelectronics and Communications Conference (OECC) held jointly with 2016 International Conference on Photonics in Switching (PS), IEICE, Jul. 3, 2016, retrieved on Oct. 26, 2016. (3 pgs.).

* cited by examiner

*Primary Examiner* — Tina Wong
(74) *Attorney, Agent, or Firm* — Christopher K. Marlow; Christopher S. Clancy; James H. Williams

(57) ABSTRACT

An apparatus having a plurality of multifiber connector interfaces, where some of these multifiber connector interfaces can connect to network equipment in a network using multifiber cables, has an internal mesh implemented in two tiers. The first is configured to rearrange and the second is configured to recombine individual fiber of the different fiber groups. The light path of each transmitter and receiver is matched in order to provide proper optical connections from transmitting to receiving fibers and complex arbitrary network topologies can be implemented with at least 1/N less point to point interconnections, where N=number of channels per multifiber connector interface.

7 Claims, 34 Drawing Sheets

| | |
|---|---|
| 320 | 420 |
| 321 | 424 |
| 322 | 428 |
| 323 | 432 |
| 324 | 436 |
| 325 | 440 |
| 326 | 444 |
| 327 | 448 |
| 328 | 421 |
| 329 | 425 |
| 330 | 429 |
| 331 | 433 |
| 332 | 437 |
| 333 | 441 |
| 334 | 445 |
| 335 | 449 |
| 336 | 422 |
| 337 | 426 |
| 338 | 430 |
| 339 | 434 |
| 340 | 438 |
| 341 | 442 |
| 342 | 446 |
| 343 | 450 |
| 344 | 423 |
| 345 | 427 |
| 346 | 431 |
| 347 | 435 |
| 348 | 439 |
| 349 | 443 |
| 350 | 447 |
| 351 | 451 |

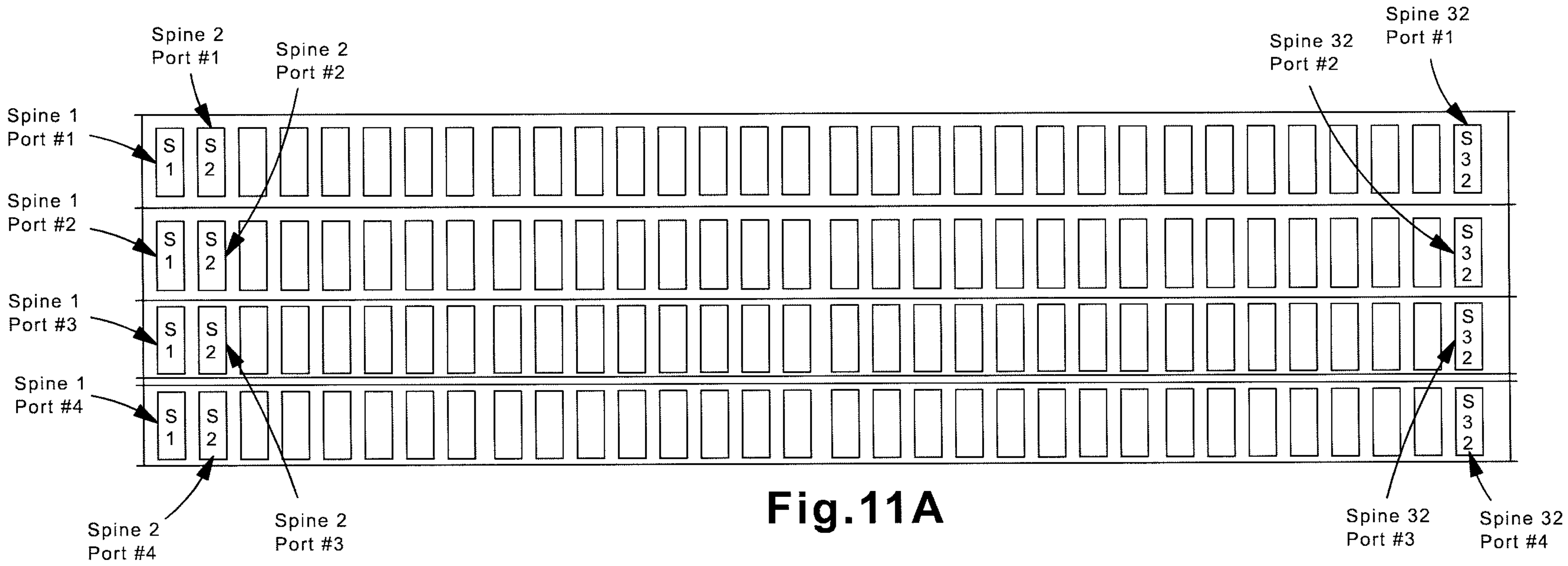

Fig.11A

| | Spine 1 | Spine 2 | Spine 3 | Spine 4 | Spine 5 | Spine 6 | Spine 7 | Spine 8 | Spine 9 | Spine 10 | Spine 11 | Spine 12 | Spine 13 | Spine 14 | Spine 15 | Spine 16 |
|---|---|---|---|---|---|---|---|---|---|---|---|---|---|---|---|---|
| Port#1 | S1 | S2 | S3 | S4 | S5 | S6 | S7 | S8 | S9 | S10 | S11 | S12 | S13 | S14 | S15 | S16 |
| Port#2 | S1 | S2 | S3 | S4 | S5 | S6 | S7 | S8 | S9 | S10 | S11 | S12 | S13 | S14 | S15 | S16 |
| Port#3 | S1 | S2 | S3 | S4 | S5 | S6 | S7 | S8 | S9 | S10 | S11 | S12 | S13 | S14 | S15 | S16 |
| Port#4 | S1 | S2 | S3 | S4 | S5 | S6 | S7 | S8 | S9 | S10 | S11 | S12 | S13 | S14 | S15 | S16 |

| | Spine 17 | Spine 18 | Spine 19 | Spine 20 | Spine 21 | Spine 22 | Spine 23 | Spine 24 | Spine 25 | Spine 26 | Spine 27 | Spine 28 | Spine 29 | Spine 30 | Spine 31 | Spine 32 |
|---|---|---|---|---|---|---|---|---|---|---|---|---|---|---|---|---|
| Port#1 | S17 | S18 | S19 | S20 | S21 | S22 | S23 | S24 | S25 | S26 | S27 | S28 | S29 | S30 | S31 | S32 |
| Port#2 | S17 | S18 | S19 | S20 | S21 | S22 | S23 | S24 | S25 | S26 | S27 | S28 | S29 | S30 | S31 | S32 |
| Port#3 | S17 | S18 | S19 | S20 | S21 | S22 | S23 | S24 | S25 | S26 | S27 | S28 | S29 | S30 | S31 | S32 |
| Port#4 | S17 | S18 | S19 | S20 | S21 | S22 | S23 | S24 | S25 | S26 | S27 | S28 | S29 | S30 | S31 | S32 |

Fig.11B

| | spine 1 | spine 1 | spine 2 | spine 2 | spine 3 | spine 3 | spine 4 | spine 4 | spine 5 | spine 5 | spine 6 | spine 6 | spine 7 | spine 7 | spine 8 | spine 8 |
|---|---|---|---|---|---|---|---|---|---|---|---|---|---|---|---|---|
| | Lcard 1 | Lcard 2 | Lcard 1 | Lcard 2 | Lcard 1 | Lcard 2 | Lcard 1 | Lcard 2 | Lcard 1 | Lcard 2 | Lcard 1 | Lcard 2 | Lcard 1 | Lcard 2 | Lcard 1 | Lcard 2 |
| Port#1 | S1 | S2 | S3 | S4 | S5 | S6 | S7 | S8 | S9 | S10 | S11 | S12 | S13 | S14 | S15 | S16 |
| Port#2 | S1 | S2 | S3 | S4 | S5 | S6 | S7 | S8 | S9 | S10 | S11 | S12 | S13 | S14 | S15 | S16 |
| Port#3 | S1 | S2 | S3 | S4 | S5 | S6 | S7 | S8 | S9 | S10 | S11 | S12 | S13 | S14 | S15 | S16 |
| Port#4 | S1 | S2 | S3 | S4 | S5 | S6 | S7 | S8 | S9 | S10 | S11 | S12 | S13 | S14 | S15 | S16 |

| spine 9 | spine 9 | spine 10 | spine 10 | spine 11 | spine 11 | spine 12 | spine 12 | spine 13 | spine 13 | spine 14 | spine 14 | spine 15 | spine 15 | spine 16 | spine 16 |
|---|---|---|---|---|---|---|---|---|---|---|---|---|---|---|---|
| Lcard 1 | Lcard 2 | Lcard 1 | Lcard 2 | Lcard 1 | Lcard 2 | Lcard 1 | Lcard 2 | Lcard 1 | Lcard 2 | Lcard 1 | Lcard 2 | Lcard 1 | Lcard 2 | Lcard 1 | Lcard 2 |
| S17 | S18 | S19 | S20 | S21 | S22 | S23 | S24 | S25 | S26 | S27 | S28 | S29 | S30 | S31 | S32 |
| S17 | S18 | S19 | S20 | S21 | S22 | S23 | S24 | S25 | S26 | S27 | S28 | S29 | S30 | S31 | S32 |
| S17 | S18 | S19 | S20 | S21 | S22 | S23 | S24 | S25 | S26 | S27 | S28 | S29 | S30 | S31 | S32 |
| S17 | S18 | S19 | S20 | S21 | S22 | S23 | S24 | S25 | S26 | S27 | S28 | S29 | S30 | S31 | S32 |

Fig.12A

| | spine 1 | spine 1 | spine 1 | spine 1 | spine 2 | spine 2 | spine 2 | spine 2 | spine 3 | spine 3 | spine 3 | spine 3 | spine 4 | spine 4 | spine 4 | spine 4 |
|---|---|---|---|---|---|---|---|---|---|---|---|---|---|---|---|---|
| | Lcard 1 | Lcard 2 | Lcard 1 | Lcard 2 | Lcard 1 | Lcard 2 | Lcard 1 | Lcard 2 | Lcard 1 | Lcard 2 | Lcard 1 | Lcard 2 | Lcard 1 | Lcard 2 | Lcard 1 | Lcard 2 |
| Port#1 | S1 | S2 | S3 | S4 | S5 | S6 | S7 | S8 | S9 | S10 | S11 | S12 | S13 | S14 | S15 | S16 |
| Port#2 | S1 | S2 | S3 | S4 | S5 | S6 | S7 | S8 | S9 | S10 | S11 | S12 | S13 | S14 | S15 | S16 |
| Port#3 | S1 | S2 | S3 | S4 | S5 | S6 | S7 | S8 | S9 | S10 | S11 | S12 | S13 | S14 | S15 | S16 |
| Port#4 | S1 | S2 | S3 | S4 | S5 | S6 | S7 | S8 | S9 | S10 | S11 | S12 | S13 | S14 | S15 | S16 |

| spine 5 | spine 5 | spine 5 | spine 5 | spine 6 | spine 6 | spine 6 | spine 6 | spine 7 | spine 7 | spine 7 | spine 7 | spine 8 | spine 8 | spine 8 | spine 8 |
|---|---|---|---|---|---|---|---|---|---|---|---|---|---|---|---|
| Lcard 1 | Lcard 2 | Lcard 1 | Lcard 2 | Lcard 1 | Lcard 2 | Lcard 1 | Lcard 2 | Lcard 1 | Lcard 2 | Lcard 1 | Lcard 2 | Lcard 1 | Lcard 2 | Lcard 1 | Lcard 2 |
| S17 | S18 | S19 | S20 | S21 | S22 | S23 | S24 | S25 | S26 | S27 | S28 | S29 | S30 | S31 | S32 |
| S17 | S18 | S19 | S20 | S21 | S22 | S23 | S24 | S25 | S26 | S27 | S28 | S29 | S30 | S31 | S32 |
| S17 | S18 | S19 | S20 | S21 | S22 | S23 | S24 | S25 | S26 | S27 | S28 | S29 | S30 | S31 | S32 |
| S17 | S18 | S19 | S20 | S21 | S22 | S23 | S24 | S25 | S26 | S27 | S28 | S29 | S30 | S31 | S32 |

Fig.12B

| | | | | | | | | | | | | | | | | |
|---|---|---|---|---|---|---|---|---|---|---|---|---|---|---|---|---|
| | spine 1 | spine 1 | spine 1 | spine 1 | spine 1 | spine 1 | spine 1 | spine 1 | spine 2 | spine 2 | spine 2 | spine 2 | spine 2 | spine 2 | spine 2 | spine 2 |
| | Lcard 1 | Lcard 2 | Lcard 1 | Lcard 2 | Lcard 1 | Lcard 2 | Lcard 1 | Lcard 2 | Lcard 1 | Lcard 2 | Lcard 1 | Lcard 2 | Lcard 1 | Lcard 2 | Lcard 1 | Lcard 2 |
| Port#1 | S1 | S2 | S3 | S4 | S5 | S6 | S7 | S8 | S9 | S10 | S11 | S12 | S13 | S14 | S15 | S16 |
| Port#2 | S1 | S2 | S3 | S4 | S5 | S6 | S7 | S8 | S9 | S10 | S11 | S12 | S13 | S14 | S15 | S16 |
| Port#3 | S1 | S2 | S3 | S4 | S5 | S6 | S7 | S8 | S9 | S10 | S11 | S12 | S13 | S14 | S15 | S16 |
| Port#4 | S1 | S2 | S3 | S4 | S5 | S6 | S7 | S8 | S9 | S10 | S11 | S12 | S13 | S14 | S15 | S16 |

| | | | | | | | | | | | | | | | |
|---|---|---|---|---|---|---|---|---|---|---|---|---|---|---|---|
| spine 3 | spine 3 | spine 3 | spine 3 | spine 3 | spine 3 | spine 3 | spine 3 | spine 4 | spine 4 | spine 4 | spine 4 | spine 4 | spine 4 | spine 4 | spine 4 |
| Lcard 1 | Lcard 2 | Lcard 1 | Lcard 2 | Lcard 1 | Lcard 2 | Lcard 1 | Lcard 2 | Lcard 1 | Lcard 2 | Lcard 1 | Lcard 2 | Lcard 1 | Lcard 2 | Lcard 1 | Lcard 2 |
| S17 | S18 | S19 | S20 | S21 | S22 | S23 | S24 | S25 | S26 | S27 | S28 | S29 | S30 | S31 | S32 |
| S17 | S18 | S19 | S20 | S21 | S22 | S23 | S24 | S25 | S26 | S27 | S28 | S29 | S30 | S31 | S32 |
| S17 | S18 | S19 | S20 | S21 | S22 | S23 | S24 | S25 | S26 | S27 | S28 | S29 | S30 | S31 | S32 |
| S17 | S18 | S19 | S20 | S21 | S22 | S23 | S24 | S25 | S26 | S27 | S28 | S29 | S30 | S31 | S32 |

Fig.12C

To Sheet 27

| | | | | | | | | | | | | | | | |
|---|---|---|---|---|---|---|---|---|---|---|---|---|---|---|---|
| L1p1 | L1p1 | L1p1 | L1p1 | L1p2 | L1p2 | L1p2 | L1p2 | L1p3 | L1p3 | L1p3 | L1p3 | L1p4 | L1p4 | L1p4 | L1p4 |
| L1p9 | L1p9 | L1p9 | L1p9 | L1p10 | L1p10 | L1p10 | L1p10 | L1p11 | L1p11 | L1p11 | L1p11 | L1p12 | L1p12 | L1p12 | L1p12 |
| L1p17 | L1p17 | L1p17 | L1p17 | L1p18 | L1p18 | L1p18 | L1p18 | L1p19 | L1p19 | L1p19 | L1p19 | L1p20 | L1p20 | L1p20 | L1p20 |
| L1p25 | L1p25 | L1p25 | L1p25 | L1p26 | L1p26 | L1p26 | L1p26 | L1p27 | L1p27 | L1p27 | L1p27 | L1p28 | L1p28 | L1p28 | L1p28 |
| L1p33 | L1p33 | L1p33 | L1p33 | L1p34 | L1p34 | L1p34 | L1p34 | L1p35 | L1p35 | L1p35 | L1p35 | L1p36 | L1p36 | L1p36 | L1p36 |
| L1p41 | L1p41 | L1p41 | L1p41 | L1p42 | L1p42 | L1p42 | L1p42 | L1p43 | L1p43 | L1p43 | L1p43 | L1p44 | L1p44 | L1p44 | L1p44 |
| L1p49 | L1p49 | L1p49 | L1p49 | L1p50 | L1p50 | L1p50 | L1p50 | L1p51 | L1p51 | L1p51 | L1p51 | L1p52 | L1p52 | L1p52 | L1p52 |
| L1p57 | L1p57 | L1p57 | L1p57 | L1p58 | L1p58 | L1p58 | L1p58 | L1p59 | L1p59 | L1p59 | L1p59 | L1p60 | L1p60 | L1p60 | L1p60 |
| | | | | | | | | | | | | | | | |
| L2p1 | L2p1 | L2p1 | L2p1 | L2p2 | L2p2 | L2p2 | L2p2 | L2p3 | L2p3 | L2p3 | L2p3 | L2p4 | L2p4 | L2p4 | L2p4 |
| L2p9 | L2p9 | L2p9 | L2p9 | L2p10 | L2p10 | L2p10 | L2p10 | L2p11 | L2p11 | L2p11 | L2p11 | L2p12 | L2p12 | L2p12 | L2p12 |
| L2p17 | L2p17 | L2p17 | L2p17 | L2p18 | L2p18 | L2p18 | L2p18 | L2p19 | L2p19 | L2p19 | L2p19 | L2p20 | L2p20 | L2p20 | L2p20 |
| L2p25 | L2p25 | L2p25 | L2p25 | L2p26 | L2p26 | L2p26 | L2p26 | L2p27 | L2p27 | L2p27 | L2p27 | L2p28 | L2p28 | L2p28 | L2p28 |
| L2p33 | L2p33 | L2p33 | L2p33 | L2p34 | L2p34 | L2p34 | L2p34 | L2p35 | L2p35 | L2p35 | L2p35 | L2p36 | L2p36 | L2p36 | L2p36 |
| L2p41 | L2p41 | L2p41 | L2p41 | L2p42 | L2p42 | L2p42 | L2p42 | L2p43 | L2p43 | L2p43 | L2p43 | L2p44 | L2p44 | L2p44 | L2p44 |
| L2p49 | L2p49 | L2p49 | L2p49 | L2p50 | L2p50 | L2p50 | L2p50 | L2p51 | L2p51 | L2p51 | L2p51 | L2p52 | L2p52 | L2p52 | L2p52 |
| L2p57 | L2p57 | L2p57 | L2p57 | L2p58 | L2p58 | L2p58 | L2p58 | L2p59 | L2p59 | L2p59 | L2p59 | L2p60 | L2p60 | L2p60 | L2p60 |
| | | | | | | | | | | | | | | | |

• • •

| | | | | | | | | | | | | | | | |
|---|---|---|---|---|---|---|---|---|---|---|---|---|---|---|---|
| L32p1 | L32p1 | L32p1 | L32p1 | L32p2 | L32p2 | L32p2 | L32p2 | L32p3 | L32p3 | L32p3 | L32p3 | L32p4 | L32p4 | L32p4 | L32p4 |
| L32p9 | L32p9 | L32p9 | L32p9 | L32p10 | L32p10 | L32p10 | L32p10 | L32p11 | L32p11 | L32p11 | L32p11 | L32p12 | L32p12 | L32p12 | L32p12 |
| L32p17 | L32p17 | L32p17 | L32p17 | L32p18 | L32p18 | L32p18 | L32p18 | L32p19 | L32p19 | L32p19 | L32p19 | L32p20 | L32p20 | L32p20 | L32p20 |
| L32p25 | L32p25 | L32p25 | L32p25 | L32p26 | L32p26 | L32p26 | L32p26 | L32p27 | L32p27 | L32p27 | L32p27 | L32p28 | L32p28 | L32p28 | L32p28 |
| L32p33 | L32p33 | L32p33 | L32p33 | L32p34 | L32p34 | L32p34 | L32p34 | L32p35 | L32p35 | L32p35 | L32p35 | L32p36 | L32p36 | L32p36 | L32p36 |
| L32p41 | L32p41 | L32p41 | L32p41 | L32p42 | L32p42 | L32p42 | L32p42 | L32p43 | L32p43 | L32p43 | L32p43 | L32p44 | L32p44 | L32p44 | L32p44 |
| L32p49 | L32p49 | L32p49 | L32p49 | L32p50 | L32p50 | L32p50 | L32p50 | L32p51 | L32p51 | L32p51 | L32p51 | L32p52 | L32p52 | L32p52 | L32p52 |
| L32p57 | L32p57 | L32p57 | L32p57 | L32p58 | L32p58 | L32p58 | L32p58 | L32p59 | L32p59 | L32p59 | L32p59 | L32p60 | L32p60 | L32p60 | L32p60 |

Fig.16A

To Sheet 26

| | | | | | | | | | | | | | | | |
|---|---|---|---|---|---|---|---|---|---|---|---|---|---|---|---|
| L1p5 | L1p5 | L1p5 | L1p5 | L1p6 | L1p6 | L1p6 | L1p6 | L1p7 | L1p7 | L1p7 | L1p7 | L1p8 | L1p8 | L1p8 | L1p8 |
| L1p13 | L1p13 | L1p13 | L1p13 | L1p14 | L1p14 | L1p14 | L1p14 | L1p15 | L1p15 | L1p15 | L1p15 | L1p16 | L1p16 | L1p16 | L1p16 |
| L1p21 | L1p21 | L1p21 | L1p21 | L1p22 | L1p22 | L1p22 | L1p22 | L1p23 | L1p23 | L1p23 | L1p23 | L1p24 | L1p24 | L1p24 | L1p24 |
| L1p29 | L1p29 | L1p29 | L1p29 | L1p30 | L1p30 | L1p30 | L1p30 | L1p31 | L1p31 | L1p31 | L1p31 | L1p32 | L1p32 | L1p32 | L1p32 |
| L1p37 | L1p37 | L1p37 | L1p37 | L1p38 | L1p38 | L1p38 | L1p38 | L1p39 | L1p39 | L1p39 | L1p39 | L1p40 | L1p40 | L1p40 | L1p40 |
| L1p45 | L1p45 | L1p45 | L1p45 | L1p46 | L1p46 | L1p46 | L1p46 | L1p47 | L1p47 | L1p47 | L1p47 | L1p48 | L1p48 | L1p48 | L1p48 |
| L1p53 | L1p53 | L1p53 | L1p53 | L1p54 | L1p54 | L1p54 | L1p54 | L1p55 | L1p55 | L1p55 | L1p55 | L1p56 | L1p56 | L1p56 | L1p56 |
| L1p61 | L1p61 | L1p61 | L1p61 | L1p62 | L1p62 | L1p62 | L1p62 | L1p63 | L1p63 | L1p63 | L1p63 | L1p64 | L1p64 | L1p64 | L1p64 |
| | | | | | | | | | | | | | | | |
| L2p5 | L2p5 | L2p5 | L2p5 | L2p6 | L2p6 | L2p6 | L2p6 | L2p7 | L2p7 | L2p7 | L2p7 | L2p8 | L2p8 | L2p8 | L2p8 |
| L2p13 | L2p13 | L2p13 | L2p13 | L2p14 | L2p14 | L2p14 | L2p14 | L2p15 | L2p15 | L2p15 | L2p15 | L2p16 | L2p16 | L2p16 | L2p16 |
| L2p21 | L2p21 | L2p21 | L2p21 | L2p22 | L2p22 | L2p22 | L2p22 | L2p23 | L2p23 | L2p23 | L2p23 | L2p24 | L2p24 | L2p24 | L2p24 |
| L2p29 | L2p29 | L2p29 | L2p29 | L2p30 | L2p30 | L2p30 | L2p30 | L2p31 | L2p31 | L2p31 | L2p31 | L2p32 | L2p32 | L2p32 | L2p32 |
| L2p37 | L2p37 | L2p37 | L2p37 | L2p38 | L2p38 | L2p38 | L2p38 | L2p39 | L2p39 | L2p39 | L2p39 | L2p40 | L2p40 | L2p40 | L2p40 |
| L2p45 | L2p45 | L2p45 | L2p45 | L2p46 | L2p46 | L2p46 | L2p46 | L2p47 | L2p47 | L2p47 | L2p47 | L2p48 | L2p48 | L2p48 | L2p48 |
| L2p53 | L2p53 | L2p53 | L2p53 | L2p54 | L2p54 | L2p54 | L2p54 | L2p55 | L2p55 | L2p55 | L2p55 | L2p56 | L2p56 | L2p56 | L2p56 |
| L2p61 | L2p61 | L2p61 | L2p61 | L2p62 | L2p62 | L2p62 | L2p62 | L2p63 | L2p63 | L2p63 | L2p63 | L2p64 | L2p64 | L2p64 | L2p64 |
| | | | | | | | | | | | | | | | |

•
•
•

| | | | | | | | | | | | | | | | |
|---|---|---|---|---|---|---|---|---|---|---|---|---|---|---|---|
| L32p5 | L32p5 | L32p5 | L32p5 | L32p6 | L32p6 | L32p6 | L32p6 | L32p7 | L32p7 | L32p7 | L32p7 | L32p8 | L32p8 | L32p8 | L32p8 |
| L32p13 | L32p13 | L32p13 | L32p13 | L32p14 | L32p14 | L32p14 | L32p14 | L32p15 | L32p15 | L32p15 | L32p15 | L32p16 | L32p16 | L32p16 | L32p16 |
| L32p21 | L32p21 | L32p21 | L32p21 | L32p22 | L32p22 | L32p22 | L32p22 | L32p23 | L32p23 | L32p23 | L32p23 | L32p24 | L32p24 | L32p24 | L32p24 |
| L32p29 | L32p29 | L32p29 | L32p29 | L32p30 | L32p30 | L32p30 | L32p30 | L32p31 | L32p31 | L32p31 | L32p31 | L32p32 | L32p32 | L32p32 | L32p32 |
| L32p37 | L32p37 | L32p37 | L32p37 | L32p38 | L32p38 | L32p38 | L32p38 | L32p39 | L32p39 | L32p39 | L32p39 | L32p40 | L32p40 | L32p40 | L32p40 |
| L32p45 | L32p45 | L32p45 | L32p45 | L32p46 | L32p46 | L32p46 | L32p46 | L32p47 | L32p47 | L32p47 | L32p47 | L32p48 | L32p48 | L32p48 | L32p48 |
| L32p53 | L32p53 | L32p53 | L32p53 | L32p54 | L32p54 | L32p54 | L32p54 | L32p55 | L32p55 | L32p55 | L32p55 | L32p56 | L32p56 | L32p56 | L32p56 |
| L32p61 | L32p61 | L32p61 | L32p61 | L32p62 | L32p62 | L32p62 | L32p62 | L32p63 | L32p63 | L32p63 | L32p63 | L32p64 | L32p64 | L32p64 | L32p64 |

Fig.16B

To Sheet 29

| | | | | | | | | | | | | | | | |
|---|---|---|---|---|---|---|---|---|---|---|---|---|---|---|---|
| S1c1 | S1c2 | S1c3 | S1c4 | S1c5 | S1c6 | S1c7 | S1c8 | S1c9 | S1c10 | S1c11 | S1c12 | S1c13 | S1c14 | S1c15 | S1c16 |
| S1c1 | S1c2 | S1c3 | S1c4 | S1c5 | S1c6 | S1c7 | S1c8 | S1c9 | S1c10 | S1c11 | S1c12 | S1c13 | S1c14 | S1c15 | S1c16 |
| S1c1 | S1c2 | S1c3 | S1c4 | S1c5 | S1c6 | S1c7 | S1c8 | S1c9 | S1c10 | S1c11 | S1c12 | S1c13 | S1c14 | S1c15 | S1c16 |
| S1c1 | S1c2 | S1c3 | S1c4 | S1c5 | S1c6 | S1c7 | S1c8 | S1c9 | S1c10 | S1c11 | S1c12 | S1c13 | S1c14 | S1c15 | S1c16 |
| S1c1 | S1c2 | S1c3 | S1c4 | S1c5 | S1c6 | S1c7 | S1c8 | S1c9 | S1c10 | S1c11 | S1c12 | S1c13 | S1c14 | S1c15 | S1c16 |
| S1c1 | S1c2 | S1c3 | S1c4 | S1c5 | S1c6 | S1c7 | S1c8 | S1c9 | S1c10 | S1c11 | S1c12 | S1c13 | S1c14 | S1c15 | S1c16 |
| S1c1 | S1c2 | S1c3 | S1c4 | S1c5 | S1c6 | S1c7 | S1c8 | S1c9 | S1c10 | S1c11 | S1c12 | S1c13 | S1c14 | S1c15 | S1c16 |
| S1c1 | S1c2 | S1c3 | S1c4 | S1c5 | S1c6 | S1c7 | S1c8 | S1c9 | S1c10 | S1c11 | S1c12 | S1c13 | S1c14 | S1c15 | S1c16 |
| | | | | | | | | | | | | | | | |
| S3c1 | S3c2 | S3c3 | S3c4 | S3c5 | S3c6 | S3c7 | S3c8 | S3c9 | S3c10 | S3c11 | S3c12 | S3c13 | S3c14 | S3c15 | S3c16 |
| S3c1 | S3c2 | S3c3 | S3c4 | S3c5 | S3c6 | S3c7 | S3c8 | S3c9 | S3c10 | S3c11 | S3c12 | S3c13 | S3c14 | S3c15 | S3c16 |
| S3c1 | S3c2 | S3c3 | S3c4 | S3c5 | S3c6 | S3c7 | S3c8 | S3c9 | S3c10 | S3c11 | S3c12 | S3c13 | S3c14 | S3c15 | S3c16 |
| S3c1 | S3c2 | S3c3 | S3c4 | S3c5 | S3c6 | S3c7 | S3c8 | S3c9 | S3c10 | S3c11 | S3c12 | S3c13 | S3c14 | S3c15 | S3c16 |
| S3c1 | S3c2 | S3c3 | S3c4 | S3c5 | S3c6 | S3c7 | S3c8 | S3c9 | S3c10 | S3c11 | S3c12 | S3c13 | S3c14 | S3c15 | S3c16 |
| S3c1 | S3c2 | S3c3 | S3c4 | S3c5 | S3c6 | S3c7 | S3c8 | S3c9 | S3c10 | S3c11 | S3c12 | S3c13 | S3c14 | S3c15 | S3c16 |
| S3c1 | S3c2 | S3c3 | S3c4 | S3c5 | S3c6 | S3c7 | S3c8 | S3c9 | S3c10 | S3c11 | S3c12 | S3c13 | S3c14 | S3c15 | S3c16 |
| S3c1 | S3c2 | S3c3 | S3c4 | S3c5 | S3c6 | S3c7 | S3c8 | S3c9 | S3c10 | S3c11 | S3c12 | S3c13 | S3c14 | S3c15 | S3c16 |
| | | | | | | | | | | | | | | | |

• • •

| | | | | | | | | | | | | | | | |
|---|---|---|---|---|---|---|---|---|---|---|---|---|---|---|---|
| S63c1 | S63c2 | S63c3 | S63c4 | S63c5 | S63c6 | S63c7 | S63c8 | S63c9 | S63c10 | S63c11 | S63c12 | S63c13 | S63c14 | S63c15 | S63c16 |
| S63c1 | S63c2 | S63c3 | S63c4 | S63c5 | S63c6 | S63c7 | S63c8 | S63c9 | S63c10 | S63c11 | S63c12 | S63c13 | S63c14 | S63c15 | S63c16 |
| S63c1 | S63c2 | S63c3 | S63c4 | S63c5 | S63c6 | S63c7 | S63c8 | S63c9 | S63c10 | S63c11 | S63c12 | S63c13 | S63c14 | S63c15 | S63c16 |
| S63c1 | S63c2 | S63c3 | S63c4 | S63c5 | S63c6 | S63c7 | S63c8 | S63c9 | S63c10 | S63c11 | S63c12 | S63c13 | S63c14 | S63c15 | S63c16 |
| S63c1 | S63c2 | S63c3 | S63c4 | S63c5 | S63c6 | S63c7 | S63c8 | S63c9 | S63c10 | S63c11 | S63c12 | S63c13 | S63c14 | S63c15 | S63c16 |
| S63c1 | S63c2 | S63c3 | S63c4 | S63c5 | S63c6 | S63c7 | S63c8 | S63c9 | S63c10 | S63c11 | S63c12 | S63c13 | S63c14 | S63c15 | S63c16 |
| S63c1 | S63c2 | S63c3 | S63c4 | S63c5 | S63c6 | S63c7 | S63c8 | S63c9 | S63c10 | S63c11 | S63c12 | S63c13 | S63c14 | S63c15 | S63c16 |
| S63c1 | S63c2 | S63c3 | S63c4 | S63c5 | S63c6 | S63c7 | S63c8 | S63c9 | S63c10 | S63c11 | S63c12 | S63c13 | S63c14 | S63c15 | S63c16 |

Fig.17A

To Sheet 28

| | | | | | | | | | | | | | | | |
|---|---|---|---|---|---|---|---|---|---|---|---|---|---|---|---|
| S2c1 | S2c2 | S2c3 | S2c4 | S2c5 | S2c6 | S2c7 | S2c8 | S2c9 | S2c10 | S2c11 | S2c12 | S2c13 | S2c14 | S2c15 | S2c16 |
| S2c1 | S2c2 | S2c3 | S2c4 | S2c5 | S2c6 | S2c7 | S2c8 | S2c9 | S2c10 | S2c11 | S2c12 | S2c13 | S2c14 | S2c15 | S2c16 |
| S2c1 | S2c2 | S2c3 | S2c4 | S2c5 | S2c6 | S2c7 | S2c8 | S2c9 | S2c10 | S2c11 | S2c12 | S2c13 | S2c14 | S2c15 | S2c16 |
| S2c1 | S2c2 | S2c3 | S2c4 | S2c5 | S2c6 | S2c7 | S2c8 | S2c9 | S2c10 | S2c11 | S2c12 | S2c13 | S2c14 | S2c15 | S2c16 |
| S2c1 | S2c2 | S2c3 | S2c4 | S2c5 | S2c6 | S2c7 | S2c8 | S2c9 | S2c10 | S2c11 | S2c12 | S2c13 | S2c14 | S2c15 | S2c16 |
| S2c1 | S2c2 | S2c3 | S2c4 | S2c5 | S2c6 | S2c7 | S2c8 | S2c9 | S2c10 | S2c11 | S2c12 | S2c13 | S2c14 | S2c15 | S2c16 |
| S2c1 | S2c2 | S2c3 | S2c4 | S2c5 | S2c6 | S2c7 | S2c8 | S2c9 | S2c10 | S2c11 | S2c12 | S2c13 | S2c14 | S2c15 | S2c16 |
| S2c1 | S2c2 | S2c3 | S2c4 | S2c5 | S2c6 | S2c7 | S2c8 | S2c9 | S2c10 | S2c11 | S2c12 | S2c13 | S2c14 | S2c15 | S2c16 |
| | | | | | | | | | | | | | | | |
| S4c1 | S4c2 | S4c3 | S4c4 | S4c5 | S4c6 | S4c7 | S4c8 | S4c9 | S4c10 | S4c11 | S4c12 | S4c13 | S4c14 | S4c15 | S4c16 |
| S4c1 | S4c2 | S4c3 | S4c4 | S4c5 | S4c6 | S4c7 | S4c8 | S4c9 | S4c10 | S4c11 | S4c12 | S4c13 | S4c14 | S4c15 | S4c16 |
| S4c1 | S4c2 | S4c3 | S4c4 | S4c5 | S4c6 | S4c7 | S4c8 | S4c9 | S4c10 | S4c11 | S4c12 | S4c13 | S4c14 | S4c15 | S4c16 |
| S4c1 | S4c2 | S4c3 | S4c4 | S4c5 | S4c6 | S4c7 | S4c8 | S4c9 | S4c10 | S4c11 | S4c12 | S4c13 | S4c14 | S4c15 | S4c16 |
| S4c1 | S4c2 | S4c3 | S4c4 | S4c5 | S4c6 | S4c7 | S4c8 | S4c9 | S4c10 | S4c11 | S4c12 | S4c13 | S4c14 | S4c15 | S4c16 |
| S4c1 | S4c2 | S4c3 | S4c4 | S4c5 | S4c6 | S4c7 | S4c8 | S4c9 | S4c10 | S4c11 | S4c12 | S4c13 | S4c14 | S4c15 | S4c16 |
| S4c1 | S4c2 | S4c3 | S4c4 | S4c5 | S4c6 | S4c7 | S4c8 | S4c9 | S4c10 | S4c11 | S4c12 | S4c13 | S4c14 | S4c15 | S4c16 |
| S4c1 | S4c2 | S4c3 | S4c4 | S4c5 | S4c6 | S4c7 | S4c8 | S4c9 | S4c10 | S4c11 | S4c12 | S4c13 | S4c14 | S4c15 | S4c16 |
| | | | | | | | | | | | | | | | |

•
•
•

| | | | | | | | | | | | | | | | |
|---|---|---|---|---|---|---|---|---|---|---|---|---|---|---|---|
| S64c1 | S64c2 | S64c3 | S64c4 | S64c5 | S64c6 | S64c7 | S64c8 | S64c9 | S64c10 | S64c11 | S64c12 | S64c13 | S64c14 | S64c15 | S64c16 |
| S64c1 | S64c2 | S64c3 | S64c4 | S64c5 | S64c6 | S64c7 | S64c8 | S64c9 | S64c10 | S64c11 | S64c12 | S64c13 | S64c14 | S64c15 | S64c16 |
| S64c1 | S64c2 | S64c3 | S64c4 | S64c5 | S64c6 | S64c7 | S64c8 | S64c9 | S64c10 | S64c11 | S64c12 | S64c13 | S64c14 | S64c15 | S64c16 |
| S64c1 | S64c2 | S64c3 | S64c4 | S64c5 | S64c6 | S64c7 | S64c8 | S64c9 | S64c10 | S64c11 | S64c12 | S64c13 | S64c14 | S64c15 | S64c16 |
| S64c1 | S64c2 | S64c3 | S64c4 | S64c5 | S64c6 | S64c7 | S64c8 | S64c9 | S64c10 | S64c11 | S64c12 | S64c13 | S64c14 | S64c15 | S64c16 |
| S64c1 | S64c2 | S64c3 | S64c4 | S64c5 | S64c6 | S64c7 | S64c8 | S64c9 | S64c10 | S64c11 | S64c12 | S64c13 | S64c14 | S64c15 | S64c16 |
| S64c1 | S64c2 | S64c3 | S64c4 | S64c5 | S64c6 | S64c7 | S64c8 | S64c9 | S64c10 | S64c11 | S64c12 | S64c13 | S64c14 | S64c15 | S64c16 |
| S64c1 | S64c2 | S64c3 | S64c4 | S64c5 | S64c6 | S64c7 | S64c8 | S64c9 | S64c10 | S64c11 | S64c12 | S64c13 | S64c14 | S64c15 | S64c16 |

Fig.17B

| | 610 | 612 | 614 | 616 | 618 | 620 | 622 | 624 |
|---|---|---|---|---|---|---|---|---|
| 510a | 550a | 550d | 550b | 550c | 550a | 550e | 595e | 595h |
| 510b | 555e | 555h | 555f | 555g | 555e | 555i | 590a | 590d |
| 510c | 560i | 560l | 560j | 560k | 560i | 565a | 580i | 580l |
| 510d | 570a | 570d | 570b | 570c | 570a | 570e | 575e | 575h |
| 510e | 575e | 575h | 575f | 575g | 575e | 575i | 570a | 570d |
| 510f | 580i | 580l | 580j | 580k | 580i | 585a | 560i | 560l |
| 510g | 590a | 590d | 590b | 590c | 590a | 590e | 555e | 555h |
| 510h | 595e | 595h | 595f | 595g | 595e | 595i | 550a | 550d |
| 510i | 600h | 600e | 600g | 600f | 600h | 600d | 555d | 555a |
| 510j | 595d | 595a | 595c | 595b | 595d | 590l | 560h | 560e |
| 510k | 585l | 585i | 585k | 585j | 585l | 585h | 565l | 565i |
| 510l | 580h | 580e | 580g | 580f | 580h | 580d | 575d | 575a |
| 515a | 575d | 575a | 575c | 575b | 575d | 570l | 580h | 580e |
| 515b | 565l | 565i | 565k | 565j | 565l | 565h | 585l | 585i |
| 515c | 560h | 560e | 560g | 560f | 560h | 560d | 595d | 595a |
| 515d | 555d | 555a | 555c | 555b | 555d | 550l | 600h | 600e |
| 515e | 550b | 550a | 550c | 550a | 550c | 550b | 595f | 595e |
| 515f | 555f | 555e | 555g | 555e | 555g | 555f | 590b | 590a |
| 515g | 560j | 560i | 560k | 560i | 560k | 560j | 580j | 580i |
| 515h | 570b | 570a | 570c | 570a | 570c | 570b | 575f | 575e |
| 515i | 575f | 575e | 575g | 575e | 575g | 575f | 570b | 570a |
| 515j | 580j | 580i | 580k | 580i | 580k | 580j | 560j | 560i |
| 515k | 590b | 590a | 590c | 590a | 590c | 590b | 555f | 555e |
| 515l | 595f | 595e | 595g | 595e | 595g | 595f | 550b | 550a |
| 520a | 600g | 600h | 600f | 600h | 600f | 600g | 555c | 555d |
| 520b | 595c | 595d | 595b | 595d | 595b | 595c | 560g | 560h |
| 520c | 585k | 585l | 585j | 585l | 585j | 585k | 565k | 565l |
| 520d | 580g | 580h | 580f | 580h | 580f | 580g | 575c | 575d |
| 520e | 575c | 575d | 575b | 575d | 575b | 575c | 580g | 580h |
| 520f | 565k | 565l | 565j | 565l | 565j | 565k | 585k | 585l |
| 520g | 560g | 560h | 560f | 560h | 560f | 560g | 595c | 595d |
| 520h | 555c | 555d | 555b | 555d | 555b | 555c | 600g | 600h |

Fig. 18A

| | 610 | 612 | 614 | 616 | 618 | 620 | 622 | 624 |
|---|---|---|---|---|---|---|---|---|
| 520i | 550c | 550b | 550d | 550b | 550e | 550c | 595g | 595f |
| 520j | 555g | 555f | 555h | 555f | 555i | 555g | 590c | 590b |
| 520k | 560k | 560j | 560l | 560j | 565a | 560k | 580k | 580j |
| 520l | 570c | 570b | 570d | 570b | 570e | 570c | 575g | 575f |
| 525a | 575g | 575f | 575h | 575f | 575i | 575g | 570c | 570b |
| 525b | 580k | 580j | 580l | 580j | 585a | 580k | 560k | 560j |
| 525c | 590c | 590b | 590d | 590b | 590e | 590c | 555g | 555f |
| 525d | 595g | 595f | 595h | 595f | 595i | 595g | 550c | 550b |
| 525e | 600f | 600g | 600e | 600g | 600d | 600f | 555b | 555c |
| 525f | 595b | 595c | 595a | 595c | 590l | 595b | 560f | 560g |
| 525g | 585j | 585k | 585i | 585k | 585h | 585j | 565j | 565k |
| 525h | 580f | 580g | 580e | 580g | 580d | 580f | 575b | 575c |
| 525i | 575b | 575c | 575a | 575c | 570l | 575b | 580f | 580g |
| 525j | 565j | 565k | 565i | 565k | 565h | 565j | 585j | 585k |
| 525k | 560f | 560g | 560e | 560g | 560d | 560f | 595b | 595c |
| 525l | 555b | 555c | 555a | 555c | 550l | 555b | 600f | 600g |
| 530a | 550d | 550c | 550a | 550e | 550b | 550a | 595h | 595g |
| 530b | 555h | 555g | 555e | 555i | 555f | 555e | 590d | 590c |
| 530c | 560l | 560k | 560i | 565a | 560j | 560i | 580l | 580k |
| 530d | 570d | 570c | 570a | 570e | 570b | 570a | 575h | 575g |
| 530e | 575h | 575g | 575e | 575i | 575f | 575e | 570d | 570c |
| 530f | 580l | 580k | 580i | 585a | 580j | 580i | 560l | 560k |
| 530g | 590d | 590c | 590a | 590e | 590b | 590a | 555h | 555g |
| 530h | 595h | 595g | 595e | 595i | 595f | 595e | 550d | 550c |
| 530i | 600e | 600f | 600h | 600d | 600g | 600h | 555a | 555b |
| 530j | 595a | 595b | 595d | 590l | 595c | 595d | 560e | 560f |
| 530k | 585i | 585j | 585l | 585h | 585k | 585l | 565i | 565j |
| 530l | 580e | 580f | 580h | 580d | 580g | 580h | 575a | 575b |
| 535a | 575a | 575b | 575d | 570l | 575c | 575d | 580e | 580f |
| 535b | 565i | 565j | 565l | 565h | 565k | 565l | 585i | 585j |
| 535c | 560e | 560f | 560h | 560d | 560g | 560h | 595a | 595b |
| 535d | 555a | 555b | 555d | 550l | 555c | 555d | 600e | 600f |

Fig. 18B

| | 610 | 612 | 614 | 616 | 618 | 620 | 622 | 624 |
|---|---|---|---|---|---|---|---|---|
| 535e | 550e | 550e | 550e | 550d | 550d | 550d | 595i | 595i |
| 535f | 555i | 555i | 555i | 555h | 555h | 555h | 590e | 590e |
| 535g | 565a | 565a | 565a | 560l | 560l | 560l | 585a | 585a |
| 535h | 570e | 570e | 570e | 570d | 570d | 570d | 575i | 575i |
| 535i | 575i | 575i | 575i | 575h | 575h | 575h | 570e | 570e |
| 535j | 585a | 585a | 585a | 580l | 580l | 580l | 565a | 565a |
| 535k | 590e | 590e | 590e | 590d | 590d | 590d | 555i | 555i |
| 535l | 595i | 595i | 595i | 595h | 595h | 595h | 550e | 550e |
| 540a | 600d | 600d | 600d | 600e | 600e | 600e | 550l | 550l |
| 540b | 590l | 590l | 590l | 595a | 595a | 595a | 560d | 560d |
| 540c | 585h | 585h | 585h | 585i | 585i | 585i | 565h | 565h |
| 540d | 580d | 580d | 580d | 580e | 580e | 580e | 570l | 570l |
| 540e | 570l | 570l | 570l | 575a | 575a | 575a | 580d | 580d |
| 540f | 565h | 565h | 565h | 565i | 565i | 565i | 585h | 585h |
| 540g | 560d | 560d | 560d | 560e | 560e | 560e | 590l | 590l |
| 540h | 550l | 550l | 550l | 555a | 555a | 555a | 600d | 600d |
| 540i | 550f | 550f | 550f | 550f | 550f | 550f | 595j | 595j |
| 540j | 555j | 555j | 555j | 555j | 555j | 555j | 590f | 590f |
| 540k | 565b | 565b | 565b | 565b | 565b | 565b | 585b | 585b |
| 540l | 570f | 570f | 570f | 570f | 570f | 570f | 575j | 575j |
| 545a | 575j | 575j | 575j | 575j | 575j | 575j | 570f | 570f |
| 545b | 585b | 585b | 585b | 585b | 585b | 585b | 565b | 565b |
| 545c | 590f | 590f | 590f | 590f | 590f | 590f | 555j | 555j |
| 545d | 595j | 595j | 595j | 595j | 595j | 595j | 550f | 550f |
| 545e | 600c | 600c | 600c | 600c | 600c | 600c | 550k | 550k |
| 545f | 590k | 590k | 590k | 590k | 590k | 590k | 560c | 560c |
| 545g | 585g | 585g | 585g | 585g | 585g | 585g | 565g | 565g |
| 545h | 580c | 580c | 580c | 580c | 580c | 580c | 570k | 570k |
| 545i | 570k | 570k | 570k | 570k | 570k | 570k | 580c | 580c |
| 545j | 565g | 565g | 565g | 565g | 565g | 565g | 585g | 585g |
| 545k | 560c | 560c | 560c | 560c | 560c | 560c | 590k | 590k |
| 545l | 550k | 550k | 550k | 550k | 550k | 550k | 600c | 600c |

Fig. 18C

| | 610 | 612 | 614 | 616 | 618 | 620 | 622 | 624 |
|---|---|---|---|---|---|---|---|---|
| 550a | 550g | 550g | 550g | 550g | 550g | 550g | 595k | 595k |
| 550b | 555k | 555k | 555k | 555k | 555k | 555k | 590g | 590g |
| 550c | 565c | 565c | 565c | 565c | 565c | 565c | 585c | 585c |
| 550d | 570g | 570g | 570g | 570g | 570g | 570g | 575k | 575k |
| 550e | 575k | 575k | 575k | 575k | 575k | 575k | 570g | 570g |
| 550f | 585c | 585c | 585c | 585c | 585c | 585c | 565c | 565c |
| 550g | 590g | 590g | 590g | 590g | 590g | 590g | 555k | 555k |
| 550h | 595k | 595k | 595k | 595k | 595k | 595k | 550g | 550g |
| 550i | 600b | 600b | 600b | 600b | 600b | 600b | 550j | 550j |
| 550j | 590j | 590j | 590j | 590j | 590j | 590j | 560b | 560b |
| 550k | 585f | 585f | 585f | 585f | 585f | 585f | 565f | 565f |
| 550l | 580b | 580b | 580b | 580b | 580b | 580b | 570j | 570j |
| 555a | 570j | 570j | 570j | 570j | 570j | 570j | 580b | 580b |
| 555b | 565f | 565f | 565f | 565f | 565f | 565f | 585f | 585f |
| 555c | 560b | 560b | 560b | 560b | 560b | 560b | 590j | 590j |
| 555d | 550j | 550j | 550j | 550j | 550j | 550j | 600b | 600b |
| 555e | 550h | 550h | 550h | 550h | 550h | 550h | 595l | 595l |
| 555f | 555l | 555l | 555l | 555l | 555l | 555l | 590h | 590h |
| 555g | 565d | 565d | 565d | 565d | 565d | 565d | 585d | 585d |
| 555h | 570h | 570h | 570h | 570h | 570h | 570h | 575l | 575l |
| 555i | 575l | 575l | 575l | 575l | 575l | 575l | 570h | 570h |
| 555j | 585d | 585d | 585d | 585d | 585d | 585d | 565d | 565d |
| 555k | 590h | 590h | 590h | 590h | 590h | 590h | 555l | 555l |
| 555l | 595l | 595l | 595l | 595l | 595l | 595l | 550h | 550h |
| 560a | 600a | 600a | 600a | 600a | 600a | 600a | 550i | 550i |
| 560b | 590i | 590i | 590i | 590i | 590i | 590i | 560a | 560a |
| 560c | 585e | 585e | 585e | 585e | 585e | 585e | 565e | 565e |
| 560d | 580a | 580a | 580a | 580a | 580a | 580a | 570i | 570i |
| 560e | 570i | 570i | 570i | 570i | 570i | 570i | 580a | 580a |
| 560f | 565e | 565e | 565e | 565e | 565e | 565e | 585e | 585e |
| 560g | 560a | 560a | 560a | 560a | 560a | 560a | 590i | 590i |
| 560h | 550i | 550i | 550i | 550i | 550i | 550i | 600a | 600a |

Fig. 18D

| | | | | | | | | |
|---|---|---|---|---|---|---|---|---|
| **460** | 420 | 424 | 428 | 432 | 436 | 440 | 444 | 448 |
| **461** | 420 | 424 | 428 | 432 | 436 | 440 | 444 | 448 |
| **462** | 420 | 424 | 428 | 432 | 436 | 440 | 444 | 448 |
| **463** | 420 | 424 | 428 | 432 | 436 | 440 | 444 | 448 |
| **464** | 420 | 424 | 428 | 432 | 436 | 440 | 444 | 448 |
| **465** | 420 | 424 | 428 | 432 | 436 | 440 | 444 | 448 |
| **466** | 420 | 424 | 428 | 432 | 436 | 440 | 444 | 448 |
| **467** | 420 | 424 | 428 | 432 | 436 | 440 | 444 | 448 |
| **468** | 421 | 425 | 429 | 433 | 437 | 441 | 445 | 449 |
| **469** | 421 | 425 | 429 | 433 | 437 | 441 | 445 | 449 |
| **470** | 421 | 425 | 429 | 433 | 437 | 441 | 445 | 449 |
| **471** | 421 | 425 | 429 | 433 | 437 | 441 | 445 | 449 |
| **472** | 421 | 425 | 429 | 433 | 437 | 441 | 445 | 449 |
| **473** | 421 | 425 | 429 | 433 | 437 | 441 | 445 | 449 |
| **474** | 421 | 425 | 429 | 433 | 437 | 441 | 445 | 449 |
| **475** | 421 | 425 | 429 | 433 | 437 | 441 | 445 | 449 |
| **476** | 422 | 426 | 430 | 434 | 438 | 442 | 446 | 450 |
| **477** | 422 | 426 | 430 | 434 | 438 | 442 | 446 | 450 |
| **478** | 422 | 426 | 430 | 434 | 438 | 442 | 446 | 450 |
| **479** | 422 | 426 | 430 | 434 | 438 | 442 | 446 | 450 |
| **480** | 422 | 426 | 430 | 434 | 438 | 442 | 446 | 450 |
| **481** | 422 | 426 | 430 | 434 | 438 | 442 | 446 | 450 |
| **482** | 422 | 426 | 430 | 434 | 438 | 442 | 446 | 450 |
| **483** | 422 | 426 | 430 | 434 | 438 | 442 | 446 | 450 |
| **484** | 423 | 427 | 431 | 435 | 439 | 443 | 447 | 451 |
| **485** | 423 | 427 | 431 | 435 | 439 | 443 | 447 | 451 |
| **486** | 423 | 427 | 431 | 435 | 439 | 443 | 447 | 451 |
| **487** | 423 | 427 | 431 | 435 | 439 | 443 | 447 | 451 |
| **488** | 423 | 427 | 431 | 435 | 439 | 443 | 447 | 451 |
| **489** | 423 | 427 | 431 | 435 | 439 | 443 | 447 | 451 |
| **490** | 423 | 427 | 431 | 435 | 439 | 443 | 447 | 451 |
| **491** | 423 | 427 | 431 | 435 | 439 | 443 | 447 | 451 |

Fig. 19

| # Spine Swtchs | Radix Spine | # Leaf Switches | Radix Leaf | Leaf downLks | # Servers | Ovscr | # Mesh Modules | Rack Size for Modules, (RU) | # Racks for modules | Ports Spine (MPO) | #LineCards |
|---|---|---|---|---|---|---|---|---|---|---|---|
| 32 | 32 | 32 | 64 | 48 | 1536 | 2:1 | 4 | 2 | 1 | 4 | 1 |
| 32 | 64 | 64 | 64 | 48 | 3072 | 2:1 | 8 | 4 | 1 | 8 | 1 |
| 32 | 128 | 128 | 64 | 48 | 6144 | 2:1 | 16 | 7 | 1 | 16 | 1 |
| 32 | 192 | 192 | 64 | 48 | 9216 | 2:1 | 24 | 11 | 1 | 24 | 1 |
| 32 | 256 | 256 | 64 | 48 | 12288 | 2:1 | 32 | 14 | 1 | 32 | 1 |
| 32 | 384 | 384 | 64 | 48 | 18432 | 2:1 | 48 | 21 | 1 | 48 | 2 |
| 32 | 512 | 512 | 64 | 48 | 24576 | 2:1 | 64 | 27 | 1 | 64 | 2 |
| 32 | 768 | 768 | 64 | 48 | 36864 | 2:1 | 96 | 41 | 1 | 96 | 3 |
| 32 | 1024 | 1024 | 64 | 48 | 49152 | 2:1 | 128 | 54 | 2 | 128 | 4 |
| 32 | 2048 | 2048 | 64 | 48 | 98304 | 2:1 | 256 | 108 | 3 | 256 | 8 |
| 32 | 4096 | 4096 | 64 | 48 | 196608 | 2:1 | 512 | 216 | 6 | 512 | 16 |

Fig. 20

| # Spine Swtchs | Radix Spine | # Leaf Switches | Radix Leaf | Leaf downLks | # Servers | Ovscr | # PODS | #Switch per POD | # Mesh Modules | Rack Size for Modules. | # Racks for modules | Ports Spine (MPO) | #LineCards |
|---|---|---|---|---|---|---|---|---|---|---|---|---|---|
| 1024 | 64 | 2048 | 64 | 32 | 65536 | 1:1 | 64 | 32 | 512 | 216 | 6 | 8 | 1 |
| 1024 | 96 | 3072 | 64 | 32 | 98304 | 1:1 | 96 | 32 | 768 | 323 | 8 | 12 | 1 |
| 1024 | 128 | 4096 | 64 | 32 | 131072 | 1:1 | 128 | 32 | 1024 | 431 | 11 | 16 | 1 |
| 1024 | 192 | 6144 | 64 | 32 | 196608 | 1:1 | 192 | 32 | 1536 | 646 | 16 | 24 | 1 |
| 1024 | 256 | 8192 | 64 | 32 | 262144 | 1:1 | 256 | 32 | 2048 | 861 | 21 | 32 | 1 |
| 1024 | 384 | 12288 | 64 | 32 | 393216 | 1:1 | 384 | 32 | 3072 | 1291 | 31 | 48 | 2 |
| 1024 | 512 | 16384 | 64 | 32 | 524288 | 1:1 | 512 | 32 | 4096 | 1721 | 41 | 64 | 2 |
| 1024 | 640 | 20480 | 64 | 32 | 655360 | 1:1 | 640 | 32 | 5120 | 2151 | 52 | 80 | 3 |
| 1024 | 768 | 24576 | 64 | 32 | 786432 | 1:1 | 768 | 32 | 6144 | 2581 | 62 | 96 | 3 |
| 1024 | 896 | 28672 | 64 | 32 | 917504 | 1:1 | 896 | 32 | 7168 | 3011 | 72 | 112 | 4 |
| 1024 | 1024 | 32768 | 64 | 32 | 1048576 | 1:1 | 1024 | 32 | 8192 | 3441 | 82 | 128 | 4 |
| 1024 | 1280 | 40960 | 64 | 32 | 1310720 | 1:1 | 1280 | 32 | 10240 | 4301 | 103 | 160 | 5 |
| 1024 | 1408 | 45056 | 64 | 32 | 1441792 | 1:1 | 1408 | 32 | 11264 | 4731 | 113 | 176 | 6 |
| 1024 | 1536 | 49152 | 64 | 32 | 1572864 | 1:1 | 1536 | 32 | 12288 | 5161 | 123 | 192 | 6 |
| 1024 | 1792 | 57344 | 64 | 32 | 1835008 | 1:1 | 1792 | 32 | 14336 | 6022 | 144 | 224 | 7 |
| 1024 | 2048 | 65536 | 64 | 32 | 2097152 | 1:1 | 2048 | 32 | 16384 | 6882 | 164 | 256 | 8 |
| 1024 | 3072 | 98304 | 64 | 32 | 3145728 | 1:1 | 3072 | 32 | 24576 | 10322 | 246 | 384 | 12 |
| 1024 | 4096 | 131072 | 64 | 32 | 4194304 | 1:1 | 4096 | 32 | 32768 | 13763 | 328 | 512 | 16 |

Fig. 21

FABRIC MODULES FOR HIGH-RADIX NETWORKS

FIELD OF INVENTION

Disclosed is an apparatus and method to improve the scalability of Data Center networks using mesh network topologies, switches of various radixes, tiers, and oversubscription ratios. The disclosed apparatus and method reduces the number of manual network connections while simplifying the cabling installation, improving the flexibility and reliability of the data center, at reduced cost.

BACKGROUND AND PRIOR ART EVALUATION

The use of optical fiber for transmitting communication signals has been rapidly growing in importance due to its high bandwidth, low attenuation, and other distinct advantages, including radiation immunity, small size, and lightweight. Datacenter architectures using optical fiber are evolving to meet the global traffic demands and the increasing number of users and applications. The rise of cloud data centers, particularly the hyperscale cloud, has significantly changed the enterprise information technology (IT) business structure, network systems, and topologies. Moreover, cloud data center requirements are impacting technology roadmaps and standardization.

The wide adoption of server virtualization and advancements in data processing and storage technologies have produced the growth of East-West traffic within the data center. Traditional three-tier switch architectures comprising Core, Aggregation, and Access (CAA) layers cannot provide the low and equalized latency channels required for East-West traffic. Moreover, since the CAA architecture utilizes spanning tree protocol to disable redundant paths and build a loop-free topology, it underutilizes the network capacity.

The Folded Clos network (FCN) or Spine-and-Leaf architecture is a better-suited topology to overcome the limitation of the three-tier CAA networks. A Clos network is a multilevel circuit switching network introduced by Charles Clos in 1953. Initially, this network was devised to increase the capacity of crossbar switches. It became less relevant due to the development and adoption of Very Large Scale Integration (VLSI) techniques. The use of complex optical interconnect topologies initially for high-performance computing (HPC) and later for cloud data centers makes this architecture relevant again. The Folded-Clos network topology utilizes two types of switch nodes, Spine, and Leaf. Each Spine is connected to each Leaf. The network can scale horizontally to enable communication between a large number of servers, while minimizing the latency and non-uniformity by simply adding more Spine and Leaf switches.

FCN depends on k, the switch radix, i.e., the ratio of Leaf switch server downlink compared to Spine switch uplink, and m, the number of tiers or layers of the network. The selection of (k,m) has a significant impact on the number of switches, the reliability and latency of the network, and the cost of deployment of the data center network. FIG. 1 shows the relationship between the number of servers for different levels of oversubscription, assuming all switches have similar radix and total oversubscription 1:1.

FIGS. 2A and 2B show an example of two FCNs with a similar number of hosts, using different radixes and levels. The higher radix, 32 in this example, connects 32 edge switches to 16 spine switches in a two-layer network, as shown in FIG. 2A. The two-level FCN provides the lowest latency at the cost of requiring a denser network (512 interconnections). By using a three-layer network, the interconnection layout simplifies (256 interconnections). However, more switches are needed, and more latency is introduced in the network. Over the last years, the need for flatter networks to address the growing traffic among machines has favored the radix increase of the switches' application-specific integrated circuits (ASICs). Currently, ASICs can handle 256 radix switches at a speed of 100 Gb/s per port. Those switches support 64×400 GbE, 128×200 GbE, or 256×100 GbE enabling flatter networks with at most three layers.

Based on industry telecommunications infrastructure Standard TIA-942-A, the locations of leaf and spine switches can be separated by tens or hundreds of meters. Typically, Spine switches are located in the main distribution area (MDA), whereas Leaf switches are located in the equipment distribution area (EDA) or horizontal distribution area (HDA).

This architecture has been proven to deliver high-bandwidth and low latency (only two hops to reach the destination), providing low oversubscription connectivity. However, for large numbers of switches, the Spine-Leaf architecture requires a complex mesh with large numbers of fibers and connectors, which increases the cost and complexity of the installation.

Future data centers will require more flexible and adaptable networks than the traditional mesh currently implemented to accommodate highly distributed computing, machine learning (ML) training loads, high levels of virtualization, and data replication.

The deployment of new data centers or scaling of data center networks with several hundred or thousands of servers is not an easy task. A large number of interconnections from Spine to Leaf switches is needed, as shown in FIG. 3. In this example, a fabric 100 can have 572 paths. Each line in the inset 120 can represent a group of eight or 12 fibers that are terminated in multi-fiber MPO connectors. The fibers can be ribbonized, in the traditional flat or rollable ribbons. The inset 110 shows a zoom-in on a small area of the fabric 100.

The interconnecting fabric similar to or larger than 100s can be prone to errors which can be accentuated in many cases by challenging deployment deadlines or the lack of training of installers. Although the Spine-Leaf topology is resilient to misplaced connections, a large number of interconnection errors will produce a noticeable impact due to performance degradation resulting in the loss of some server links. Managing large-scale network configurations usually requires a dedicated crew to check the interconnections, which causes delays and increases the cost of the deployment.

Using transpose boxes, as shown in the prior art, can help to reduce installation errors. However, the prior art cannot be easily adapted to different network topologies, switches radixes, or oversubscription levels.

A new mesh method and apparatus that utilizes modular flexible, and better-organized interconnection mapping that can be quickly and reliably deployed in the data center is disclosed here.

In U.S. Pat. No. 8,621,111, US 2012/0250679 A1, and US 2014/0025843 A1, a method of providing scalability in a data transmission network using a transpose box was disclosed. This box can connect the first tier and second tier of a network. This box facilitates the deployment of the network. However, a dedicated box for a selected network is required. As described in that application, the network topology dictates the type of transpose box to be used. Changes in the topology can require swapping the transpose boxes. Based on the description, a different box will be needed if the number of Spine or Leaf switches changes, the oversubscription, or other parameters of the network change.

Once the topology is selected, the application provides a method for scaling. This requires connecting the port of one box to another with a cable. This adds losses to the network and cannot efficiently accommodate the scaling of the network.

This approach disclosed in US 2014/0025843 A1, can work well for a large data center that has already selected the type of network architecture to be implemented and can prepare and maintain stock of different kinds of transpose boxes for its needs. A more flexible or modular approach is needed for a broader deployment of mesh networks in data centers.

In W2019099771A1, an interconnection box is disclosed. This application shows exemplary wiring to connect individual Spine and Leaf switches using a rack-mountable 1 RU module. The ports of these modules are connected internally using internal multi-fiber cables that have a specific mesh incorporated. However, the module appears to be tuned to a particular topology, such as providing mesh among four spine and leaf switch ports. The application does not describe how the device can be used for topologies with a variable number of leaf or spine switches or with a variable number of ports.

In US20150295655A, an optical interconnection assembly that uses a plurality of leaf-side multiplexers and demultiplexers at each side of the network, one on the Spine side and another set near the Leaf is described. Each mux and demux is configured to work together in the desired topology. However, the application does not demonstrate the flexibility and scalability of this approach.

U.S. Pat. No. 11,269,152 describes a method to circumvent the limitations of optical shuffle boxes, which according to the application, do not easily accommodate for reconfiguration or expansion of switch networks. The application describes apparatuses and methods for patching the network links using multiple distribution frames. At least two chassis are needed to connect switches from one to another layer of a network. Each chassis can accommodate a multiplicity of modules, e.g., cassettes arranged in a vertical configuration. The connection from a first-tier switch to one side of the modules is made using breakout cables. One side of the breakout cables is terminated in MPO (24 fibers) and the other in LC or other duplex connectors. One side of the modules has one or two MPO ports, and the other six duplex LC connectors or newer very-small form factor (VSFF) connectors.

Similarly, the second-tier switch is connected to modules in the other chassis. The patching needed to connect the switches is performed using a plurality of jumper assemblies configured to connect to the plurality of optical modules. The jumpers are specially designed to fix their relative positions since they must maintain the correct (linear) order. U.S. Pat. No. 11,269,152 describes a method for patching, and it can make networks more scalable depending on the network radix. However, the network deployment is still challenging and susceptible to interconnection errors.

SUMMARY

An apparatus having a plurality of multifiber connector interfaces, where some of these multifiber connector interfaces can connect to network equipment in a network using multifiber cables, has an internal mesh implemented in two tiers. The first is configured to rearrange and the second is configured to recombine individual fiber of the different fiber groups. The light path of each transmitter and receiver is matched in order to provide proper optical connections from transmitting to receiving fibers and complex arbitrary network topologies can be implemented with at least 1/N less point to point interconnections, where N=number of channels per multifiber connector interface.

BRIEF DESCRIPTION OF THE DRAWINGS

FIG. 11A shows an example of interconnections between Spine port and Modules 400.

FIG. 11B shows an interconnection table for the example of FIG. 11(*a*).

FIG. 12A shows an example of interconnections between ports of modules 400 and Spine chassis ports 16 spines with two linecards each.

FIG. 12B shows an example of interconnections between ports of modules 400 and Spine chassis ports eight spines with four spines with four linecards each.

FIG. 12C shows an example of interconnections between ports of modules 400 and Spine chassis ports 4 spines with eight Spines with eight linecards each.

FIG. 16A Illustrates a method for implementing two-tier FCN (combined with FIG. 16B).

FIG. 16B Illustrates a method for implementing two-tier FCN (combined with FIG. 16A).

FIG. 17A Illustrates a method for implementing two-tier FCN (combined with FIG. 17B).

FIG. 17B Illustrates a method for implementing two-tier FCN (combined with FIG. 17A).

FIG. 18A shows part 1 (of 4) of Table 1 which details interconnection configurations of submodule 500.

FIG. 18B shows part 2 of Table 1 which details interconnection configurations of submodule 500.

FIG. 18C shows part 3 of Table I which details interconnection configurations of submodule 500.

FIG. 18D shows part 4 of Table 1 which details interconnection configurations of submodule 500.

FIG. 19 shows Table II which is a mesh configuration of a module.

FIG. 20 shows Table III, parameters for two-layer FCN with 16 spine switches. For the number of switches and servers, the required number of modules 400, and its size in rack units are shown.

FIG. 21 shows Table IV, Parameters for three-layer FCNs with oversubscription 1:1 for 1024 Spine switches. For the number of switches and servers, the required number of modules 400, and its size in rack units are shown.

DESCRIPTION OF INVENTION

A modular apparatus and general method to deploy optical networks of a diversity of tiers and radixes are disclosed in this document. The module and method can be used with standalone, stacked, or chassis network switches as long as the modular connections utilize MPO connectors with 16. In particular, switches with Ethernet specified SR or DR transceivers in their ports, such as 400GBASE-SR8, 800GBASE-SR8, or 800GBASE-DR8, can use these modules without any change in connectivity. Other types of transceivers, such as 400GBASE-FR4/LR4, can also be used by combining four transceiver ports with a hardness or breakout cassette.

Figure 4A:
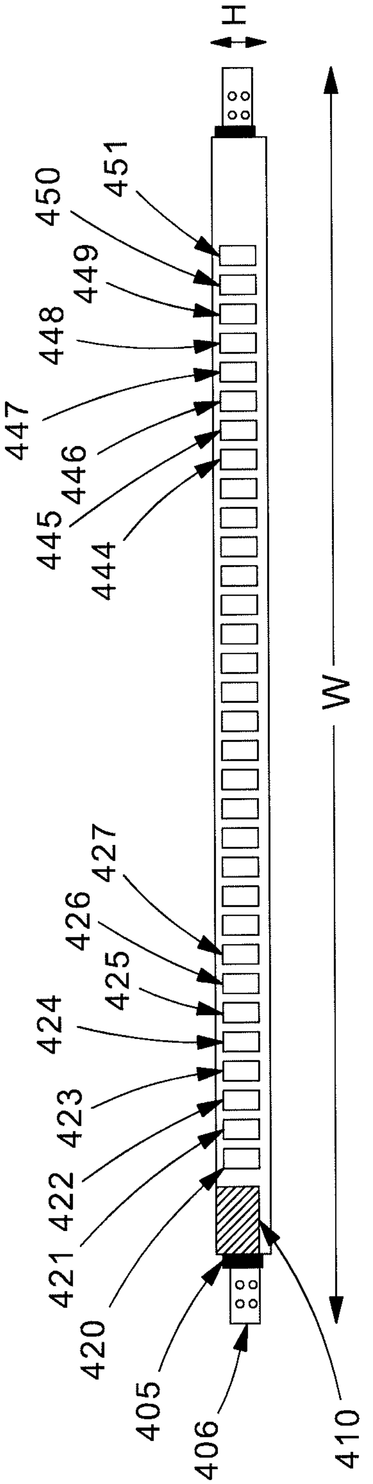
FIG. 4A shows a front view of the disclosed module 400.
Figure 4B:
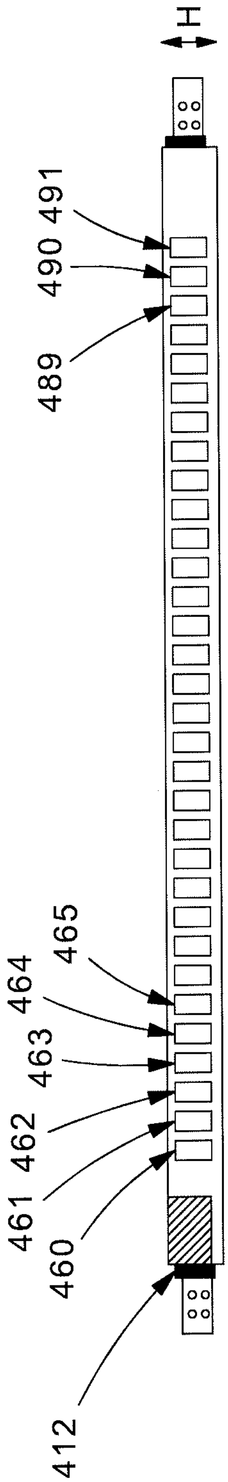
FIG. 4B shows the rear view of module 400.

FIG. 4A shows a front view of the disclosed module 400, which is the key element in facilitating optical network deployment, reshaping, and scaling. In this embodiment, the module has 64 MPO connectors that can be divided into the front and rear sections, as shown in the figures. Alternatively, the 64 ports could be located on one face of the device (not shown here).

For the sake of illustration, we assume that ports 420 to 451, each representing a MPO connector are located on the front side of the module, facing the Leaf switches, as shown in FIG. 4A of the figure. On the other side of the module, ports 440 to 491 (opposite to the 420-451 ports), each representing one MPO connector, face the Spine switches connections. The MPO dimensions allow a module width, W, which can be in the range of 12 inches up to 19 inches, and the height, H, is in the range of 0.4 to 0.64 inches. The MPO connectors can be placed in a vertical way, as shown in the figure to allocate more space. Machine-readable labels 410, and 412, can help deploy or check the network interconnection as described later in this application. Also, lateral rails, 405, on both sides of the module, would enable the modules to be inserted into a chassis structure if required. Alternatively, using brackets 406, the modules can be directly attached to the rack. By using the specified height range for this embodiment, up to four modules can be stacked in less than 1.6 RU depending on density requirements.

Figure 5:
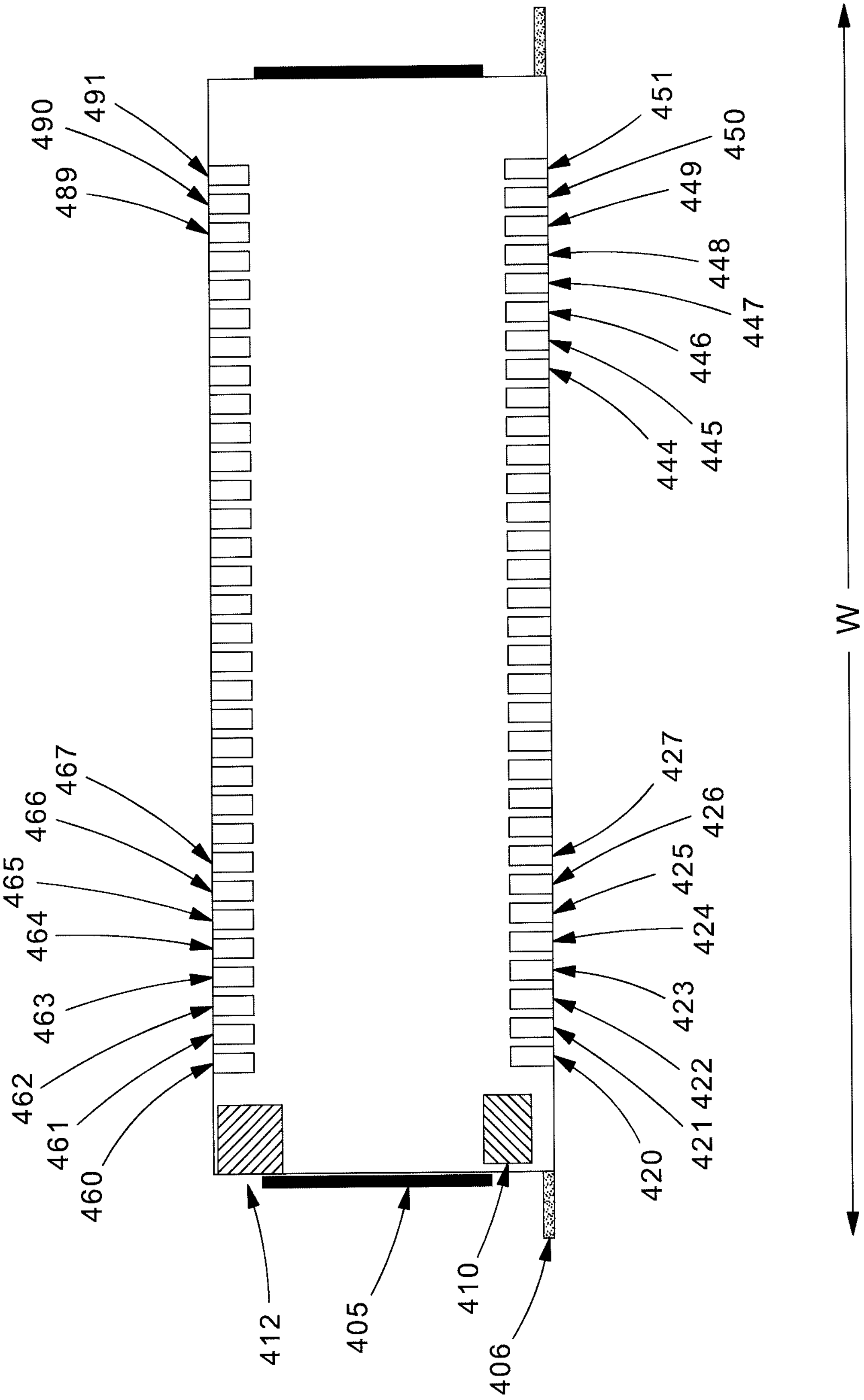
FIG. 5 shows a top view of module 400.

FIG. 5 shows a top view of the module, showing additional machine-readable labels 410 and 412. A laser scanner or a camera can read the labels. The read code can link to a database that has the interconnection maps of all modules in the network. The information can be displayed on a portable device, tablet, phone, or augmented reality lens to facilitate the deployment. See RSs 16563 and 25512 for more specific information on this.

Figure 6:
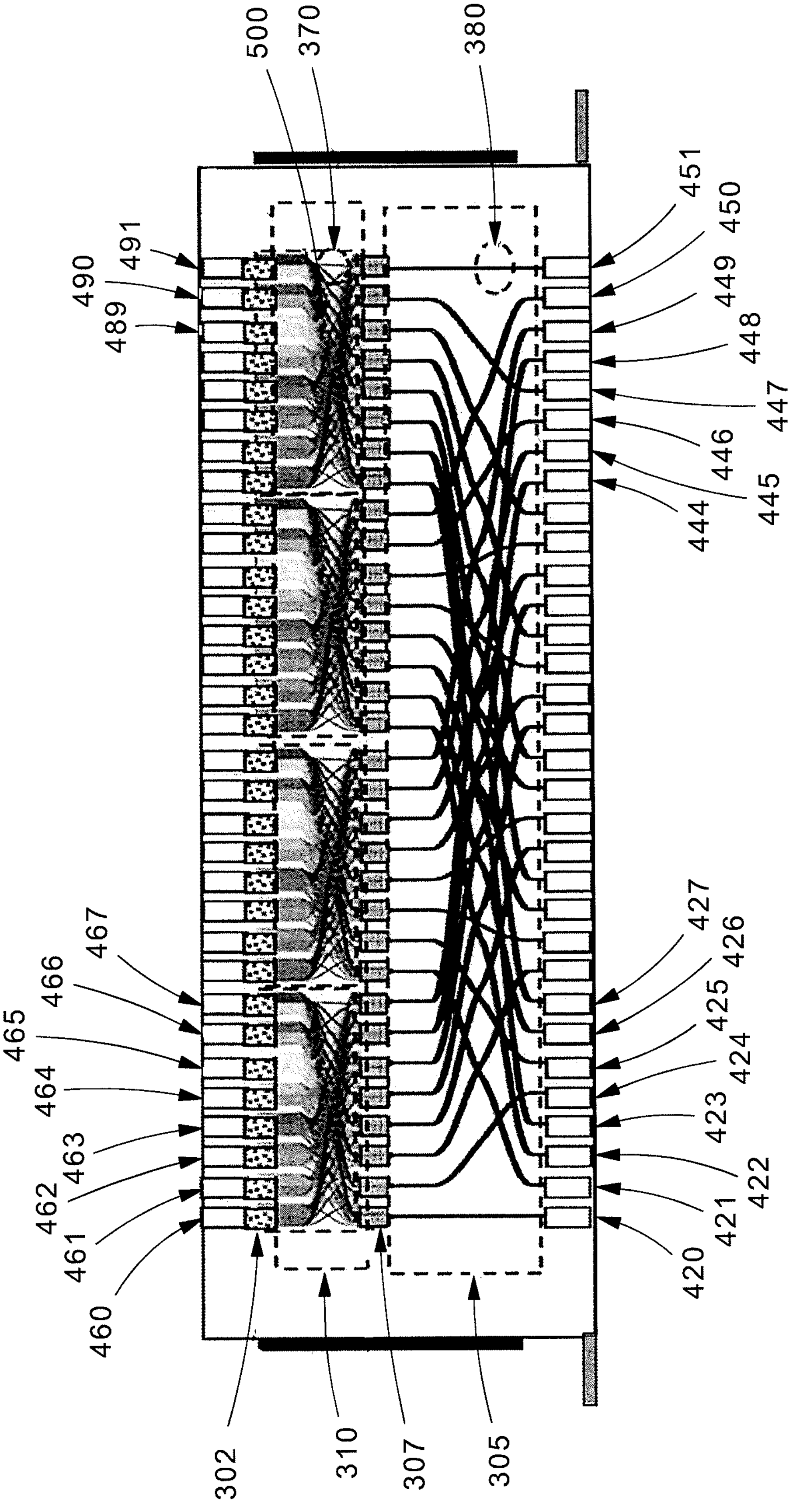
FIG. 6 shows the interconnections of module 400.
Figure 7:
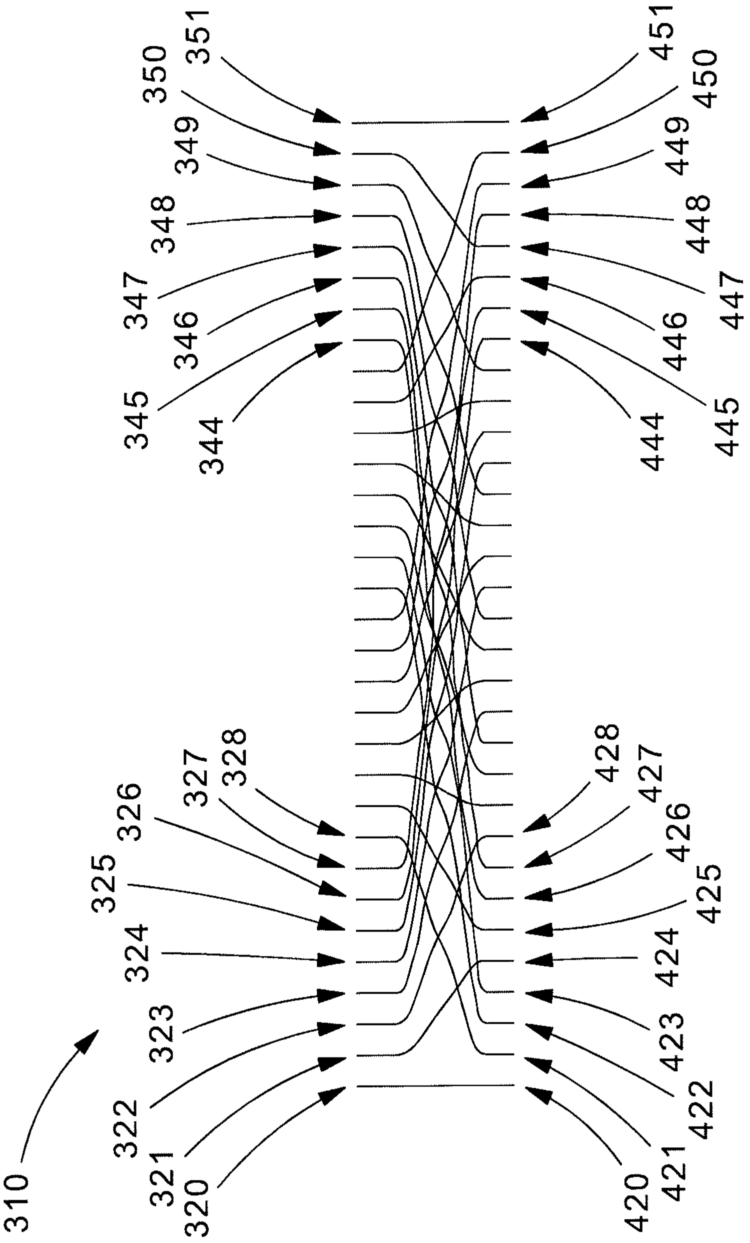
FIG. 7 illustrates of the interconnection scheme from input to output ports of region 305.

FIG. 6 shows the whole interconnection scheme of the modules according to the present invention. To simplify the module structure, the mesh is divided into two regions, 305 and 310. Region 305 re-orders groups of fibers, e.g., 380, which can be standard or rollable ribbons or just cable units of 16 fibers. The interconnection method of region 305, from ports 420 to 451 to ports 320 to 351, shown in FIG. 7, is needed to increase the mesh diversity and provide an optimum combination of individual fibers, in region 310. FIG. 6 shows how individual fibers, such as 370, are paired with groups of fibers, e.g., 380.

Figure 8:
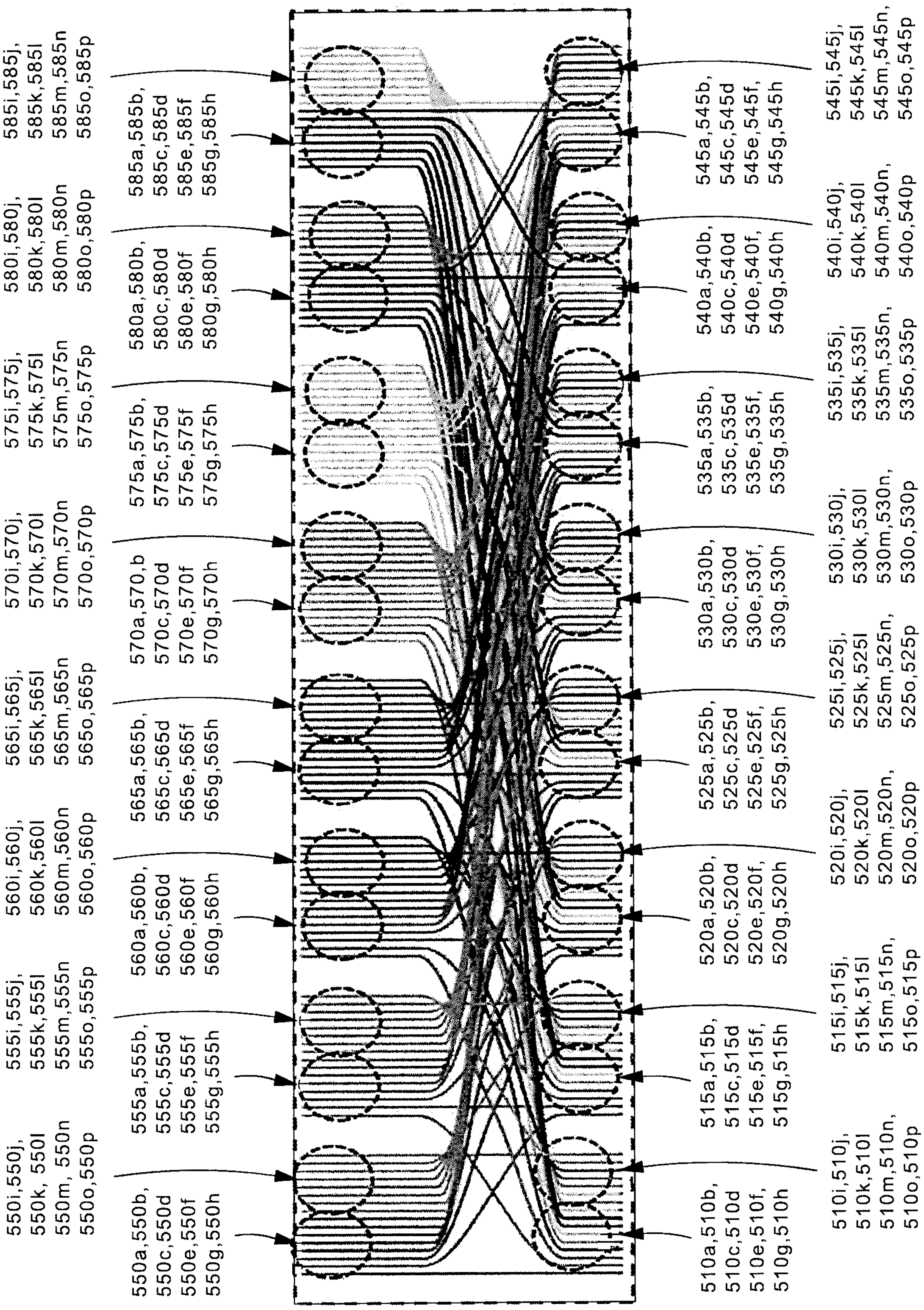
FIG. 8 is a top view of submodule 500 showing interconnection arrangements.

Region 310 contains four submodules, 500, which produce the interconnection mesh of the eight groups of fibers. FIG. 8 shows an interconnection diagram for one submodule 500, indicating how each of the fibers from ports groups 510 to 545, which connect to region 305, are distributed to ports 550 to 585.

Figure 9:
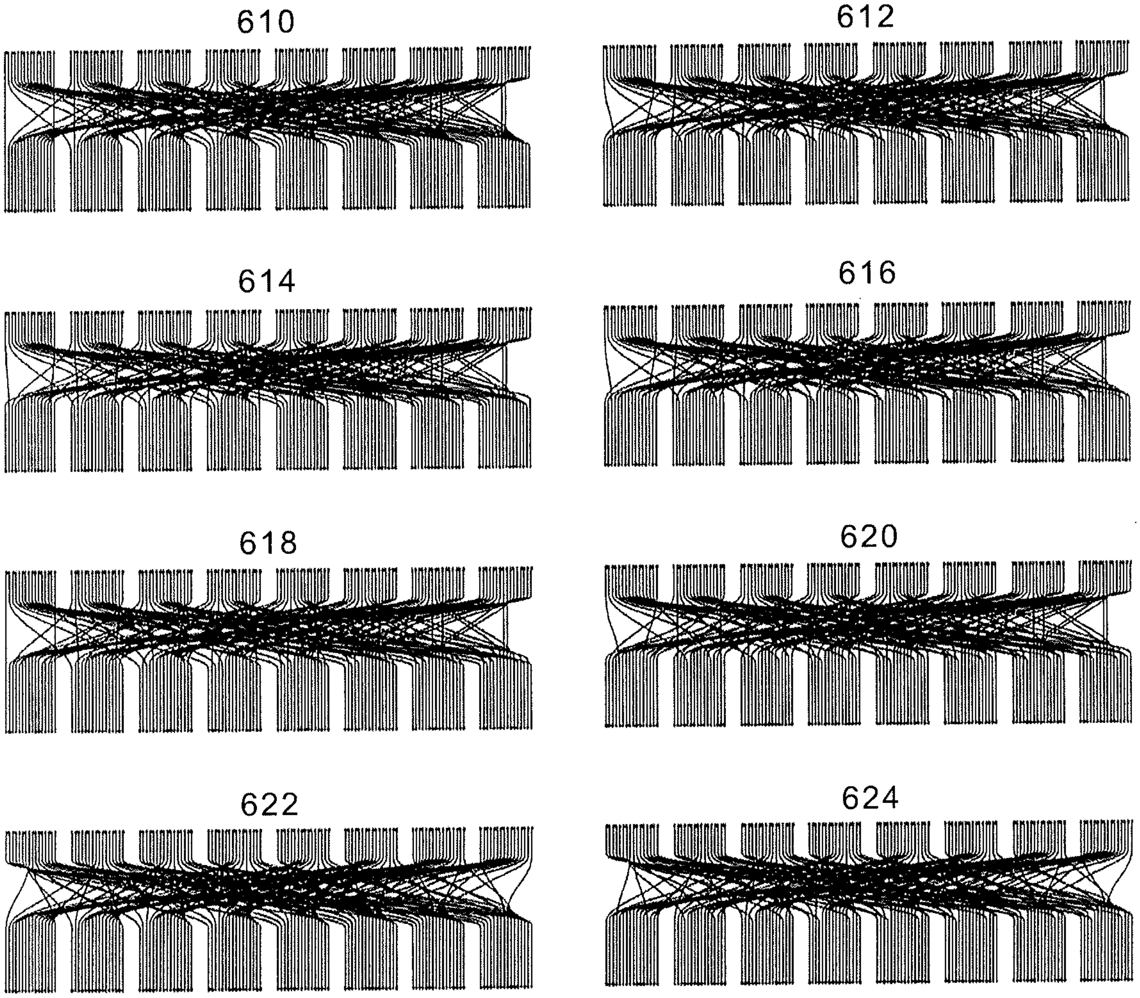
FIG. 9 shows 8 possible configurations that can be implemented in a submodule.

For an MPO transmitting eight parallel channels, the mesh of submodule 500 has internally 64 duplex fiber interconnections. The interconnections that enable full-duplex bandwidth communication among ports can be implemented in several millions of, eight of them are shown in FIG. 9. Any of these configurations can be used to implement the submodules 500 as long they are employed consistently in the modules 400. The interconnection configurations for eight configurations are listed in Table I (FIGS. 18A-D).

The groups of fibers from regions 305 to 310 are connected at interfaces 307. The interfaces 307 can be implemented using a mechanical splice, multi-fiber connectors, or mass fusion splice. The latter is preferable to achieve lower losses. Similarly, the groups of fibers from region 310, 32 groups of fibers from four 500 modules, connect to ports 460 to 490 using fusion or mechanical splice or multifiber connectors represented by 302.

The resultant interconnection map of module 400, comprising the meshing of groups of fibers, region 305, and the meshing of individual fibers, region 310, is shown in Table II (FIG. 19). As described in the table, each output port has meshed with exactly eight input ports. For example, the first eight ports, 460 to 467, have meshed with ports 420, 424, 428, 432, 436, 440, 444, and 448. The last eight ports, 484 to 491, have meshed with ports 423, 427, 431, 435, 439, 443, 447, and 451. Hence, according to the present invention, an apparatus mixes the Ethernet physical media dependent (PMD) lanes with other transceiver PMD lanes to facilitate interconnections of Spine and Leaf switches and distribute the traffic flow among multiple redundant paths. The two-step mesh incorporated in each module 400, by combining sections 305 and 310, increases the degree of fiber connections inside each module. This apparatus simplifies the network deployment since a significant part of the network complexity is moved from the structured cabling fabric to one or more modules 400. Using module 400 and following simple rules to connect a group of uplinks or downlinks horizontally or vertically, the installation becomes cleaner, and cable management is highly improved, as shown in the following description of this application.

Figure 10A:
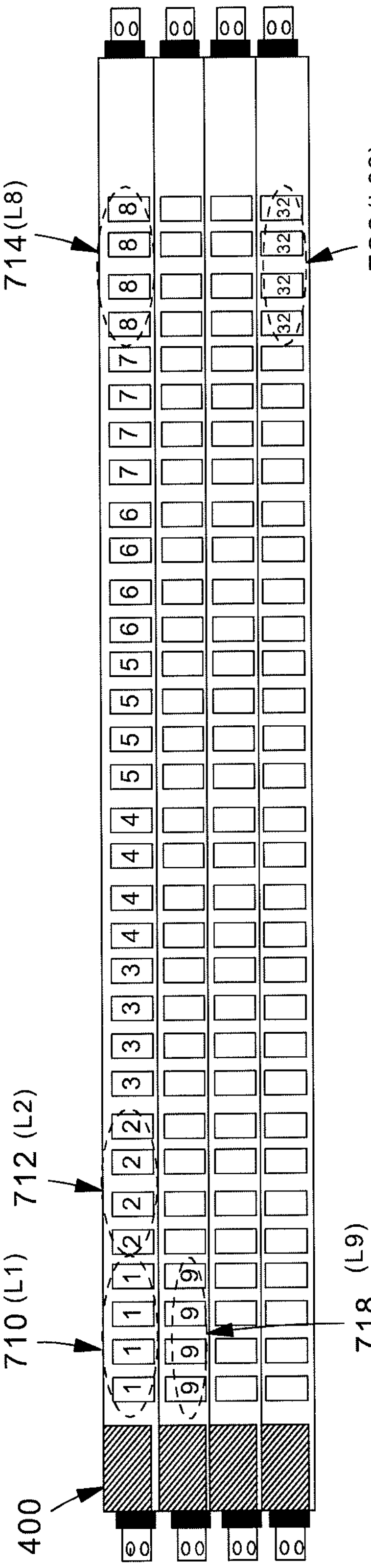
FIG. 10A Illustrates a spine side of a module simple method for implementing networks with 16 Leaf Switches and up to 16 Spine switches, using the modules 400.
Figure 10B:
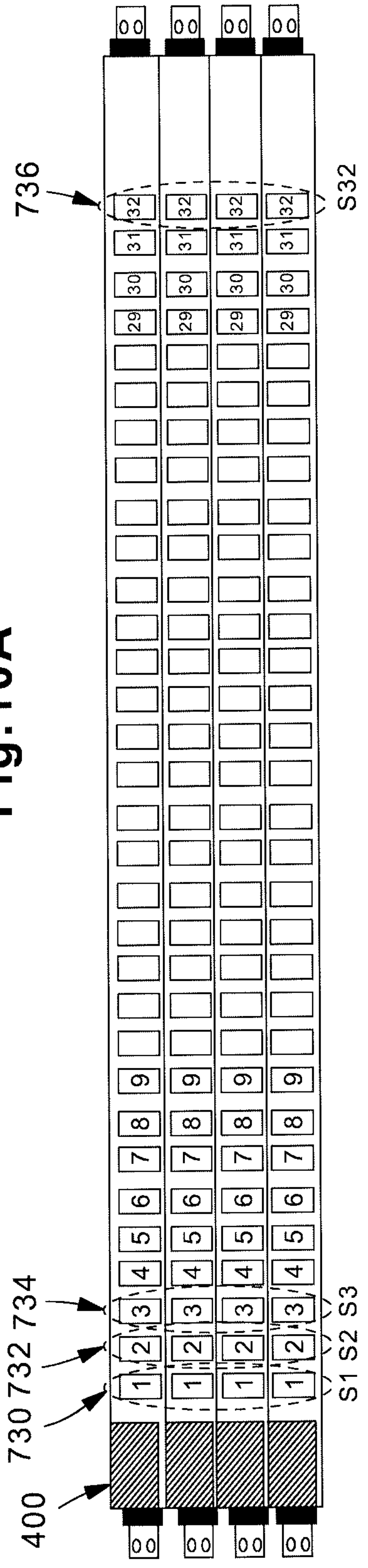
FIG. 10B illustrates a leaf side of a module for a simple method for implementing networks with 16 Spine switches.

A stack of several modules 400 can enable networks of diverse configurations and radixes, with various numbers of Spine and Leaf switches. For example, FIGS. 10A-10D shows a stack of four modules 400. FIG. 10A of the figure shows the module side that is connected to the Leaf switches. For simplicity, we label this as the front side. FIG. 10B shows the opposite side of the same module 400, the backside, which is connected to the Spine switches.

Figure 10C:
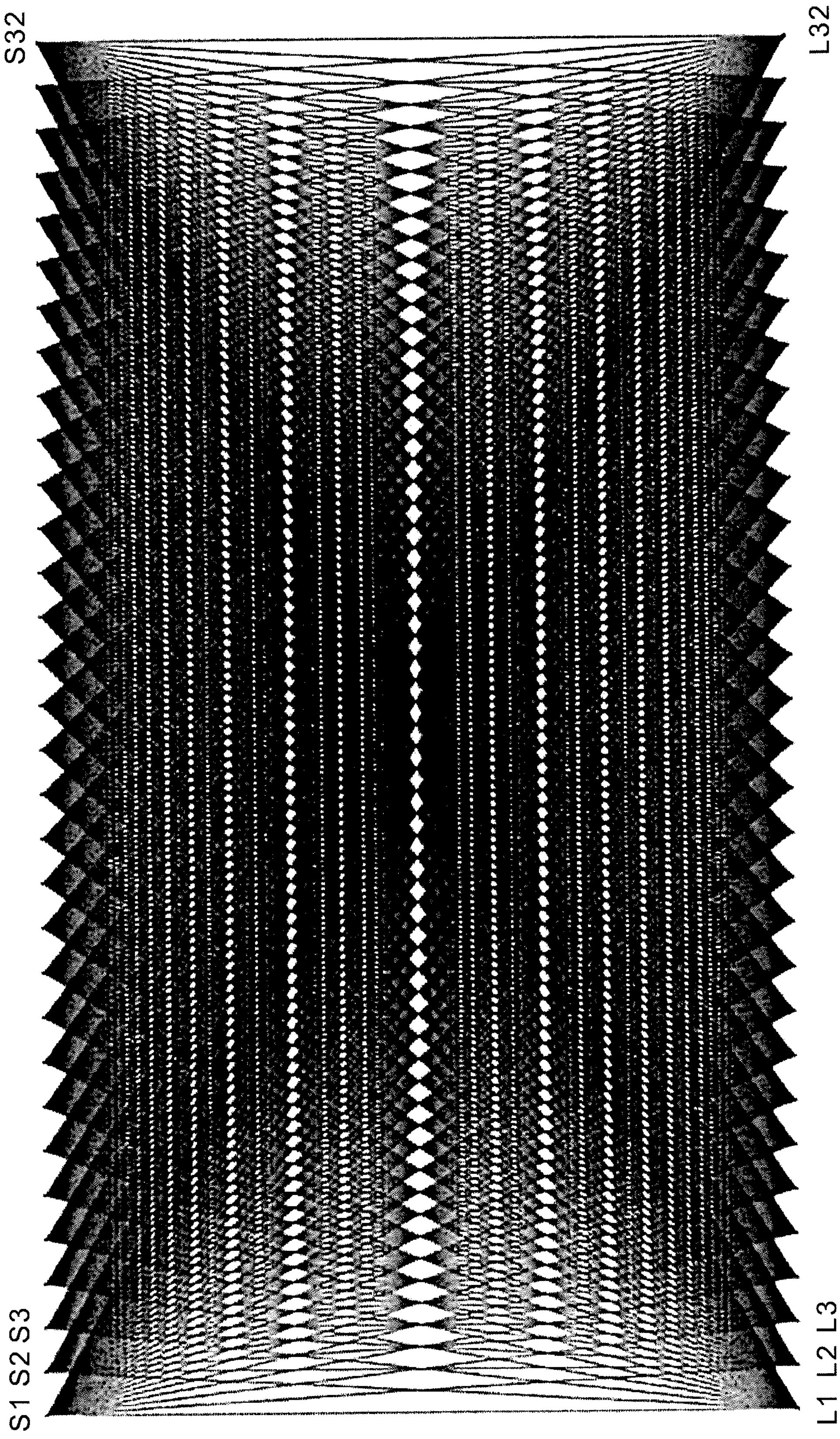
FIG. 10C helps illustrates the connections for a simple method for implementing networks with 16 Spine switches.

The diagrams in FIGS. 10A-10D assume that thirty-two Leaf switches, each with four MPO uplinks, need to be connected to the fabric shown in FIG. 10C. In this illustrative example, the uplinks of the Leaf switches are connected horizontally in groups of four until the last port of each module 400 is used. For example, 710 ports connect to the first fourth uplinks of the first Leaf switch, and 712 connect to the first fourth uplinks of the second Leaf switch. The last four ports of the first module 400 in the stack, 714, connect to the first fourth uplinks of the eighth Leaf switch. Following the previous description and FIG. 10D, we can say that module ports 710, 712, and 714 connect to four uplinks from Leaf switches L1, L2, and L8. The first ports of the second module 400, ports 718, connect to the uplinks of the ninth Leaf Switch (L9) and the last ports of the bottom module 400 in the stack, ports 720, connect to four uplinks from the thirty-second Leaf switch (L32).

The Spines ports are assigned at the backside of the stacked modules 400, as shown in part (b) of FIG. 10. For example, if standalone Spine switches are used, 730, 732, 734, and 736 correspond to ports of the first, second, third, and thirty-second Spine switch, respectively, labeled as S1, S2, S3, and S32 in FIGS. 10A-10D. A more detailed description of the connections from the module to the Spines is shown in FIGS. 11A and 11B. In FIG. 11A of that figure, the connection of ports S1, S2, and S32 to standalone Spine switches is shown. FIG. 11B shows an interconnection table for all the ports.

Figure 12D:
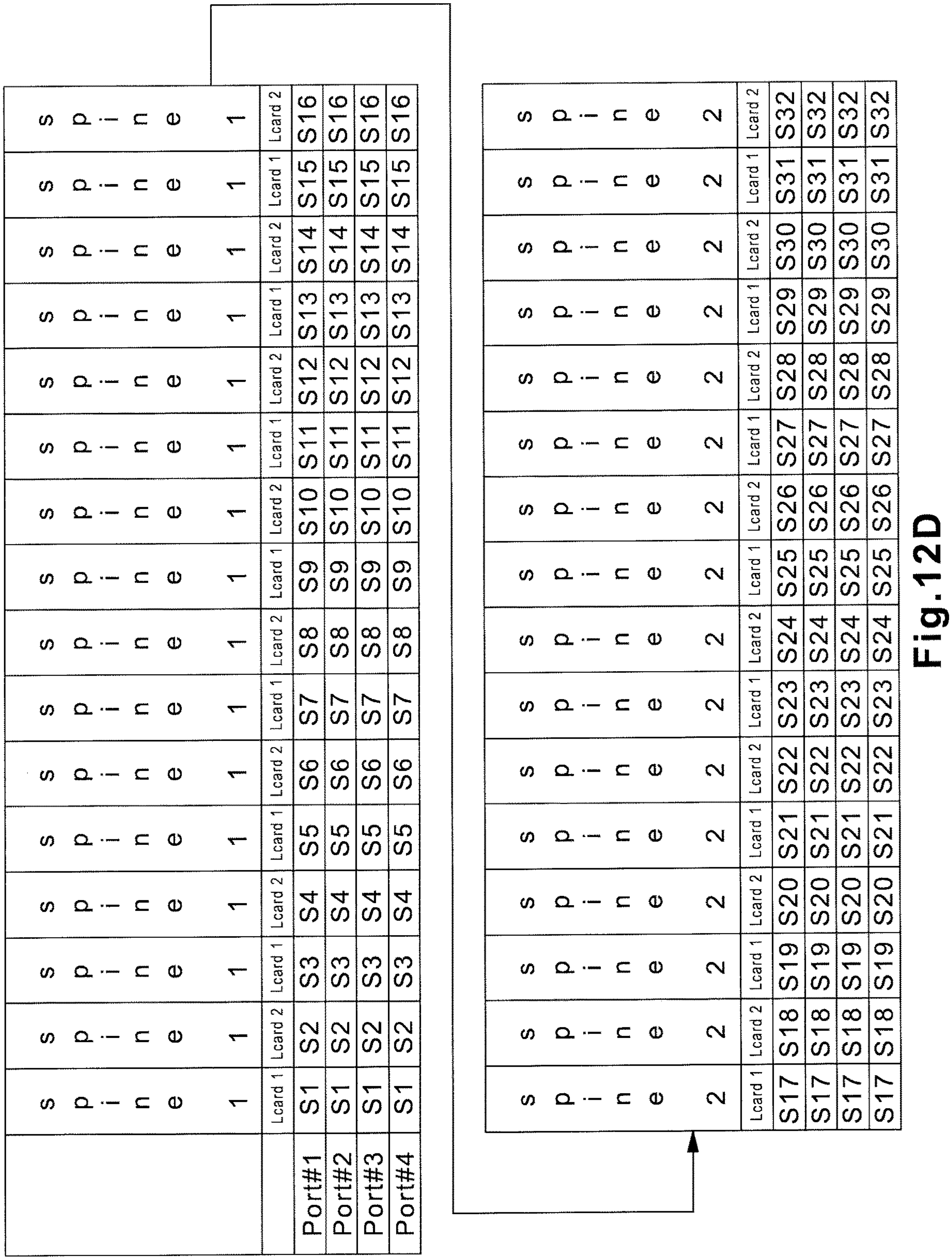
FIG. 12D shows an example of interconnections between ports of modules 400 and Spine chassis ports two spines with sixteen Spines with eight linecards each.

Alternatively, the Spines can be implemented using chassis switches. Although more expensive than standalone systems, chassis switches can provide several advantages, such as scalability, reliability, and performance. The port connectivity of the Spines using chassis switches can follow various configurations some of them described in FIGS. 12A-12D. For example, using sixteen Spine switches, with two linecards each, all S1 and S2 ports can connect to the first Spine, S3 and S4 to the second Spine, and S31 and S32 ports to the sixteenth Spine, as shown in FIG. 12A. Using eight Spine switches with four linecards each, all S1, S2, S3, and S4 ports can connect to the first Spine, S5, S6, S7, S8 to the second Spine, and S29, S30, S31, S32 to the last Spine as shown in FIG. 12B. Using four Spine switches with eight linecards each, the ports S1 to S8 can connect to the first Spine, S9 to S16 ports can connect to the second Spine, and S25 to S32 to the last Spine, as shown in FIG. 12C. Otherwise, by using two Spines, with sixteen linecards, each S1 to S16 will be connected to the first Spine and the rest to the second Spine, as shown in FIG. 12D.

Figure 10D:
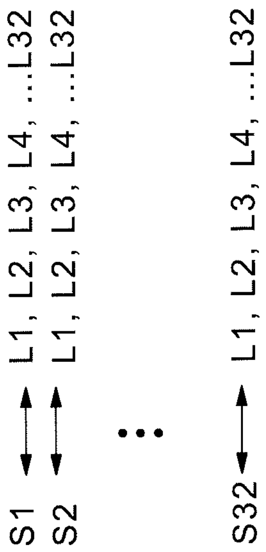
FIG. 10D further illustrates the method for implementing networks with 16 Spine switches.

Using modules 400 and the described method, each Spine switch interconnects with all the thirty-two Leaf switches to thirty-two Spine switches, as shown in FIGS. 10C and 10D. The network deployment using stacks of modules 400 enables significantly broader configuration alternatives while providing the required number of Spine-Leaf connections with various bandwidth and oversubscription requirements. Moreover, using the stack of modules 400 increases the resilience to interconnection mistakes during network deployments. In all the tables shown in FIGS. 12A-12D, the columns' permutation has no impact on the network performance. For example, interchanging 51 to S2, S3, or S32 pots on the backside of the stack of modules 400 preserves interconnectivity maps to the Leaf ports connected to the front side of the module stack. In general, module 400, reduces the complexity of scaling out or scaling up, or even de-scaling the network, as it is shown in the following examples.

The interconnection inside modules 400 can transmit signal at any wavelength from 830 nm-1650 nm. Moreover, the signals assigned to each wavelength can propagate in one direction, e.g., from a transmitter to receiver or in a bidirectional way, e.g., using bidirectional transceivers.

An important metric to characterize the degree of complexity reduction in the modules is the aggregated data rates per module are estimated using, $Da=f\times Nf\times Nc\times D$, where Nf is the number of fibers used per connector, e.g., Nf=16, Nc, the number of adapters in module 400, e.g., Nc=32, D is the data rate per fiber in one direction, and the f account for the bidirectional communication if bidirectional transceivers are used. For example, using the typical case shown in this document, Nf=16, Nc=32, f=1, Da=512 D. For current transceivers operating at D D=100 Gbps/lambda, Da=51.2 Tbps. Assuming next-generation transceivers operating at D=200 Gbps/lambda, Da=102.4 Tbps. Using VSFF connectors such as SN-MT or MMC, 3 NIMs can fit in 1 RU, enabling mesh data rate densities of 307.2 Tbps per RU of mesh connectivity between switches. One rack (assume 50 Rus) full of modules 400 can potentially provide up to 15 Pbps of mesh connectivity.

Examples of Network Deployment of Networks Using Modules 400

Figure 14A:
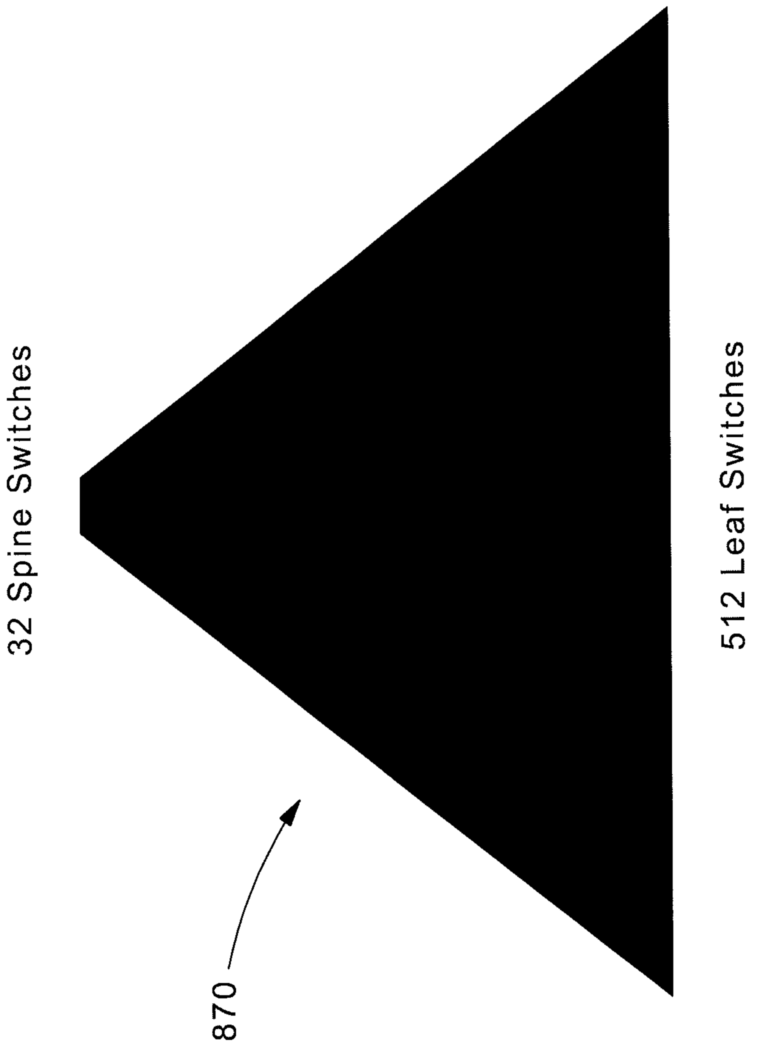
FIG. 14A Illustrates a method for implementing two-tier FCN (combined with FIG. 14B).
Figure 14B:
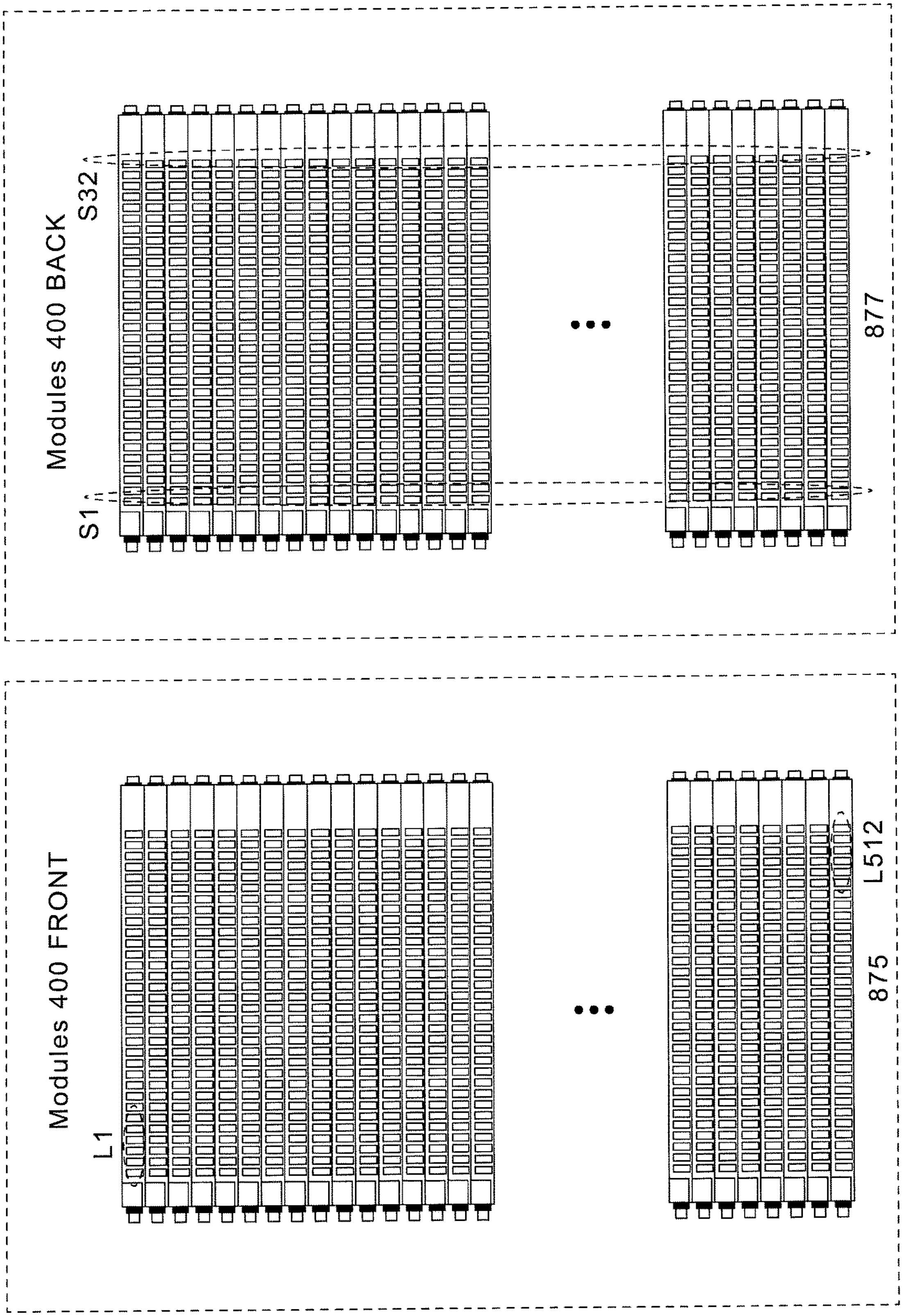
FIG. 14B Illustrates a method for implementing two-tier FCN (combined with FIG. 14A).
Figure 15A:
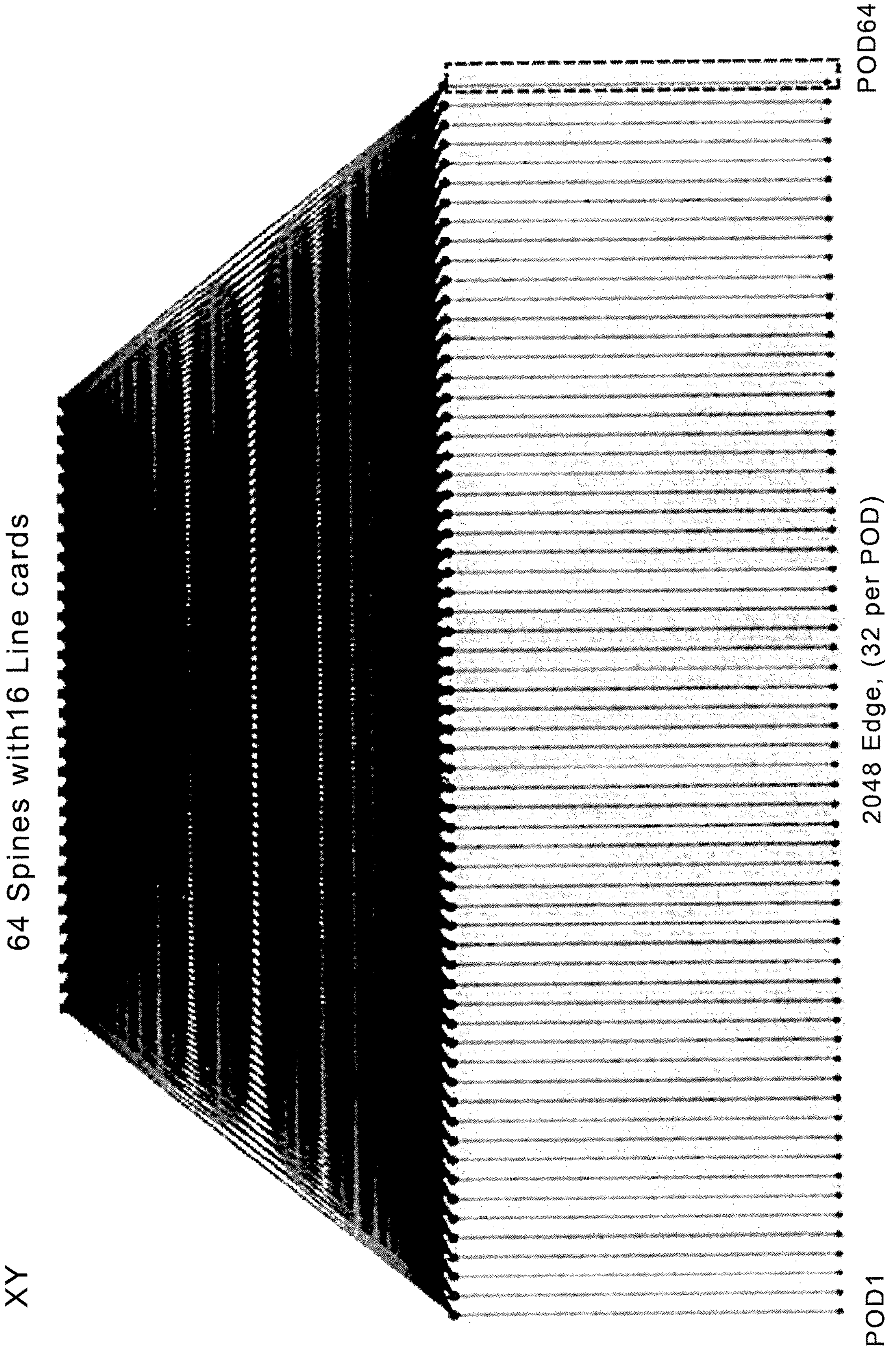
FIG. 15A Illustrates a method for implementing two-tier FCN (combined with FIG. 15B).
Figure 15B:
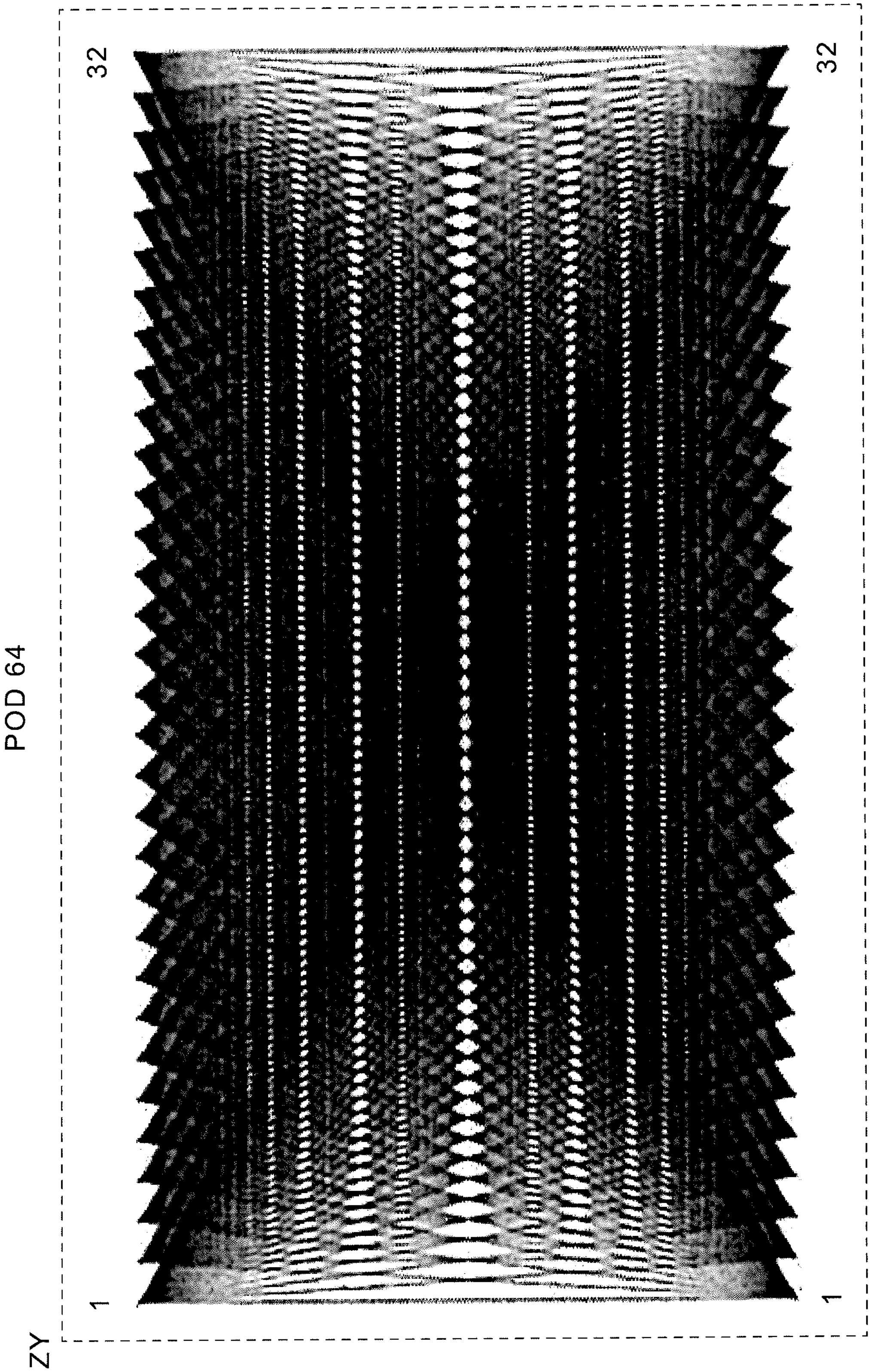
FIG. 15B Illustrates a method for implementing two tier FCN (combined with FIG. 15A).
Figure 15C:
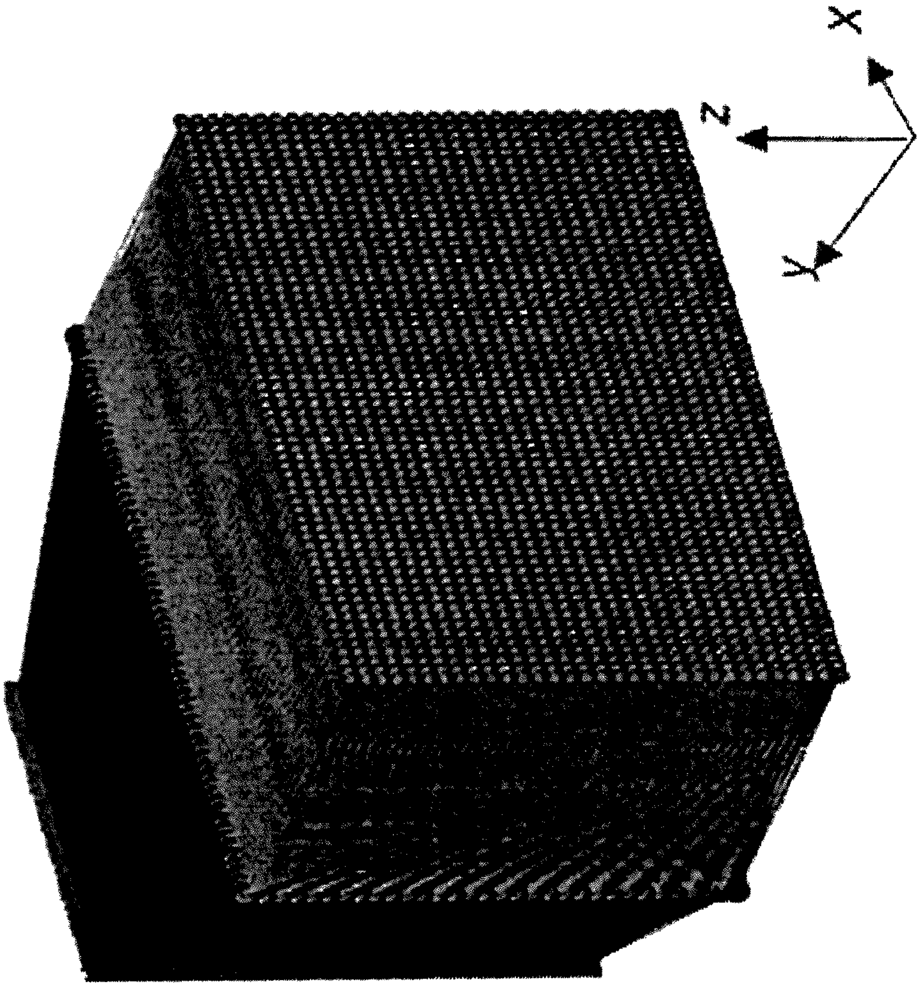

The examples in FIGS. 13 to 15 show the implementation of two-tier and three-tier FCNs of various radixes, oversubscription, and sizes using modules 400. A detailed description of the number of modules needed for each network and an estimation of the rack space required for the modules is shown in Tables III to V.

Figure 13A:
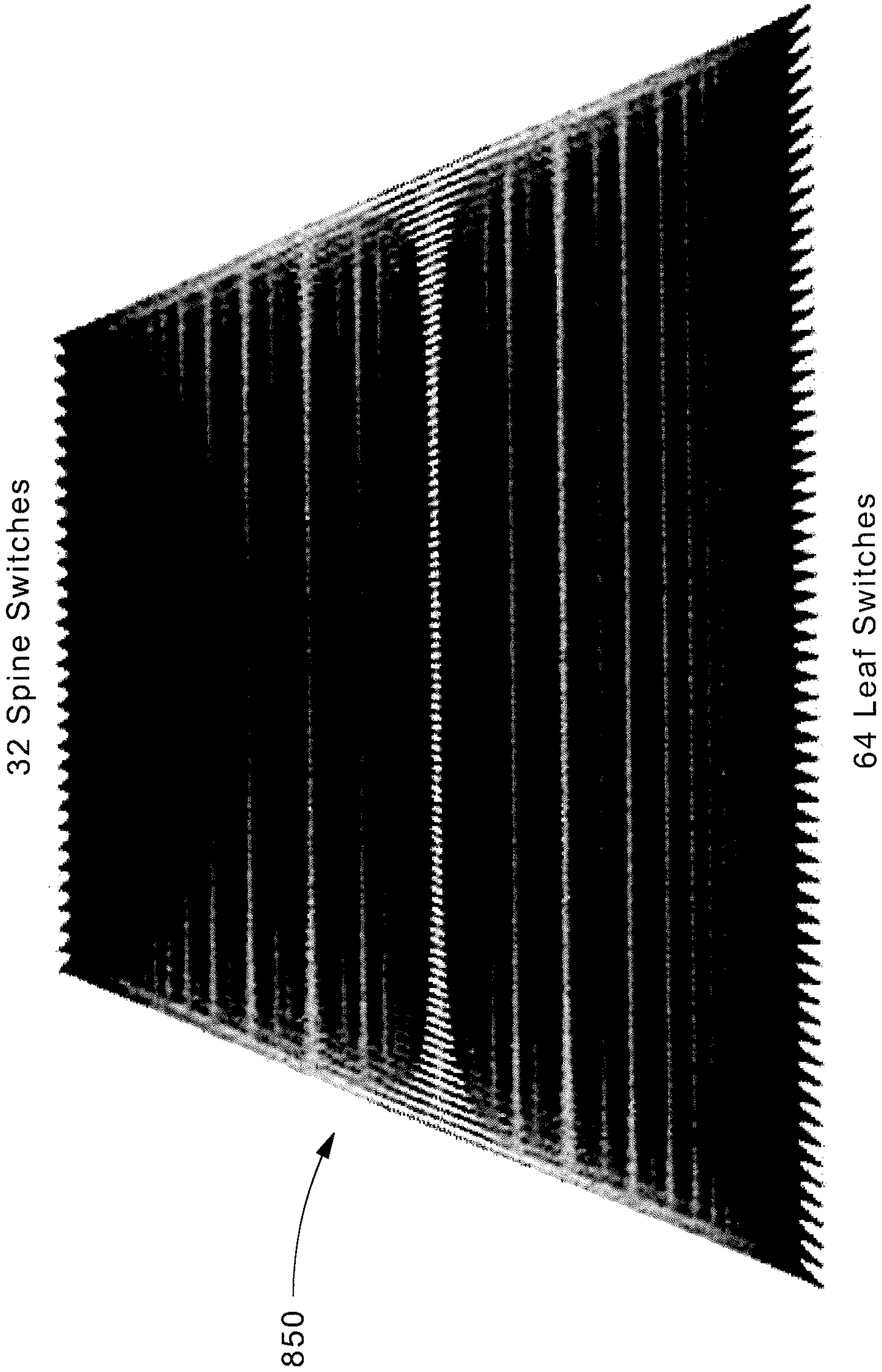
FIG. 13A Illustrates a method for implementing two-tier FCN (combined with FIG. 13B)
Figure 13B:
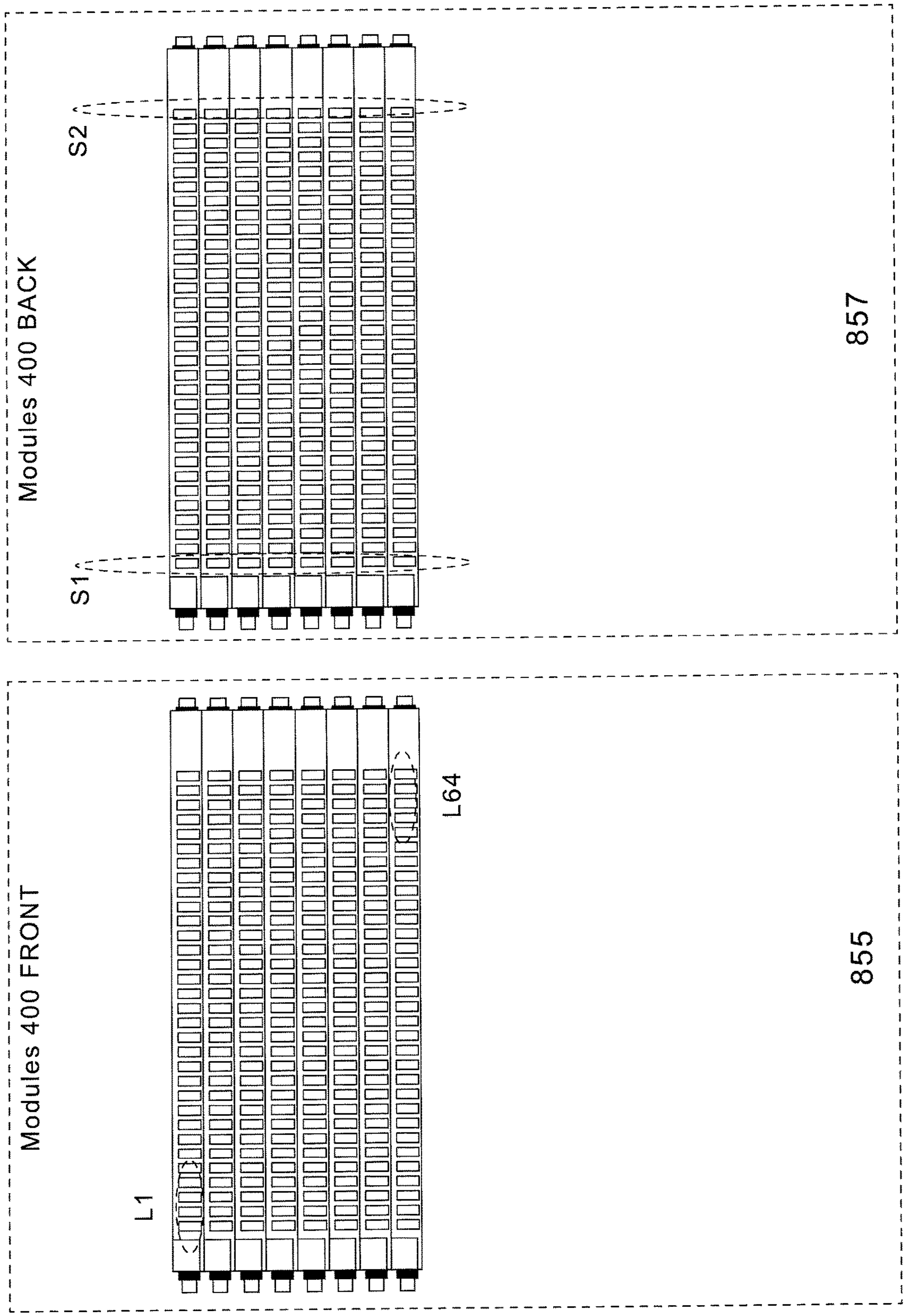
FIG. 13B Illustrates a method for implementing two-tier FCN (combined with FIG. 13A).

Starting with two-tier FCNs, FIGS. 13A and 13B shows that a fabric 850, with 32 Spine and 64 Leaf switches, implemented using eight modules 400. The connection scheme of the stack is shown from both sides of modules 400, one labeled front, 855, and the one labeled back, 857. The 855 side connects to 64 Leaf switches with four MPO uplinks with sixteen fibers per connector. The switches are labeled Li, where i is the index of the switch. For this example, i is in the range of 1 to 64. As shown in the figure on the 855 front side, the Leaf switches connect horizontally following the methods shown previously. For example, the fourth L1 uplinks are connected adjacently in the first four ports of the first module 400. All L64 uplinks are connected to the last four ports of the eighth module 400. From the side 857 the backside of the same module stack, 32 Spine switches connect vertically, as shown in the figure. Based on the disclosed dimensions range of module 400, this fabric can be implemented in less than 4 RU.

Table II shows that the two-tier network can be scaled out to a large number of Leaf switches. This table also shows the number of modules 400 and rack space for those modules that are required to implement those networks. FIGS. 14A and 14B. 14 shows an example from that table. A fabric 870 with up to 32 Spine and 512 Leaf switches, implemented using 64 modules 400. The connection scheme of the stack is shown from both sides of modules 400, one labeled front, 875, and the one labeled back, 877. The 875 side connects to 512 Leaf switches with four MPO uplinks. For example, the fourth L1 uplinks are connected adjacently in the first four ports of the first module 400. All L512 uplinks are connected to the last four ports of the 64th module 400. From the side 877 the backside of the same module stack, 32 Spine switches connect vertically, as shown in the figure. As described previously in FIGS. 12A-12D, only two Spine switches are required when using chassis switches with 16 linecards.

Figure 1:
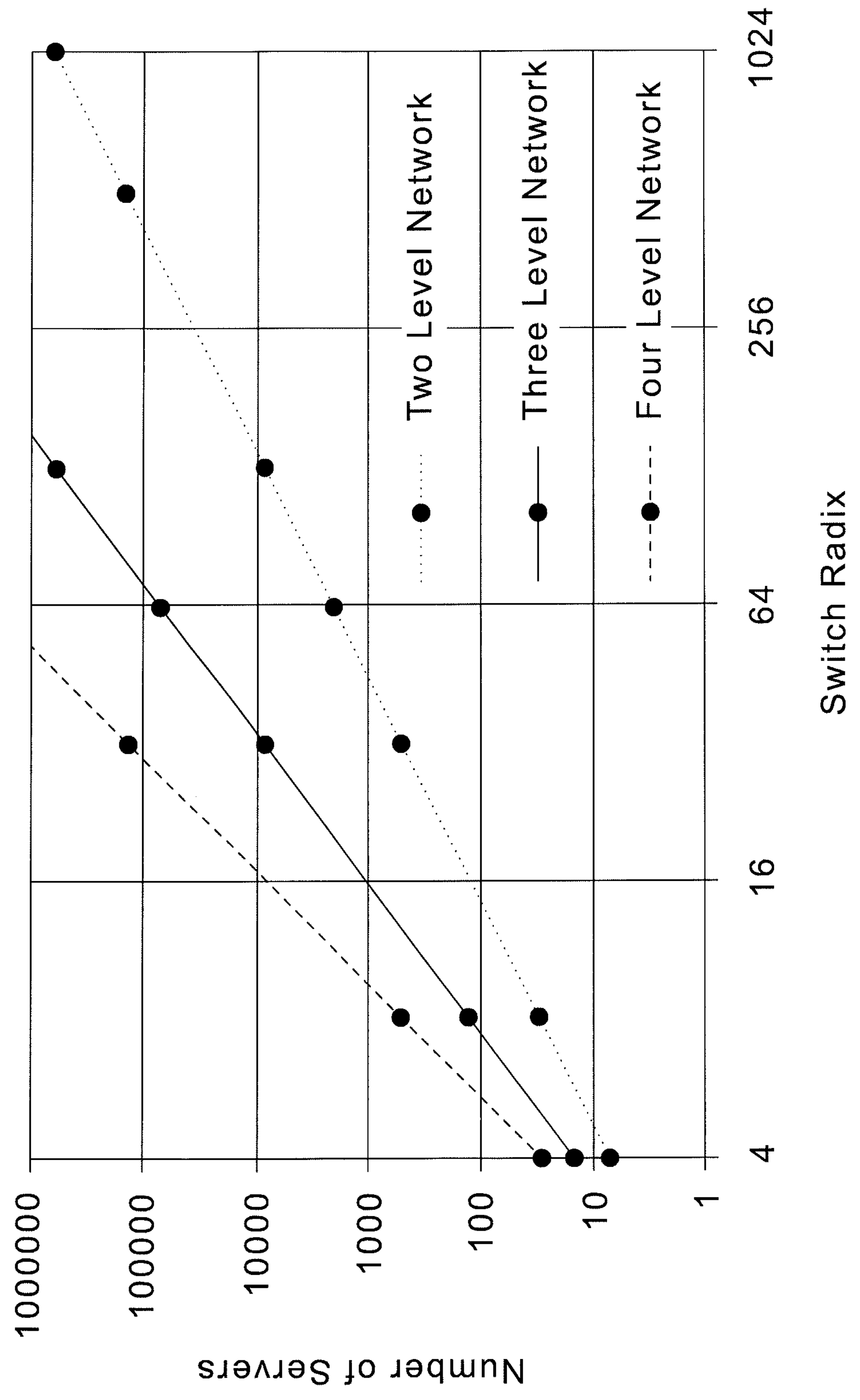
FIG. 1 shows the number of servers as a function of switch radix and the number of switch layers of the network.
Figure 2A:
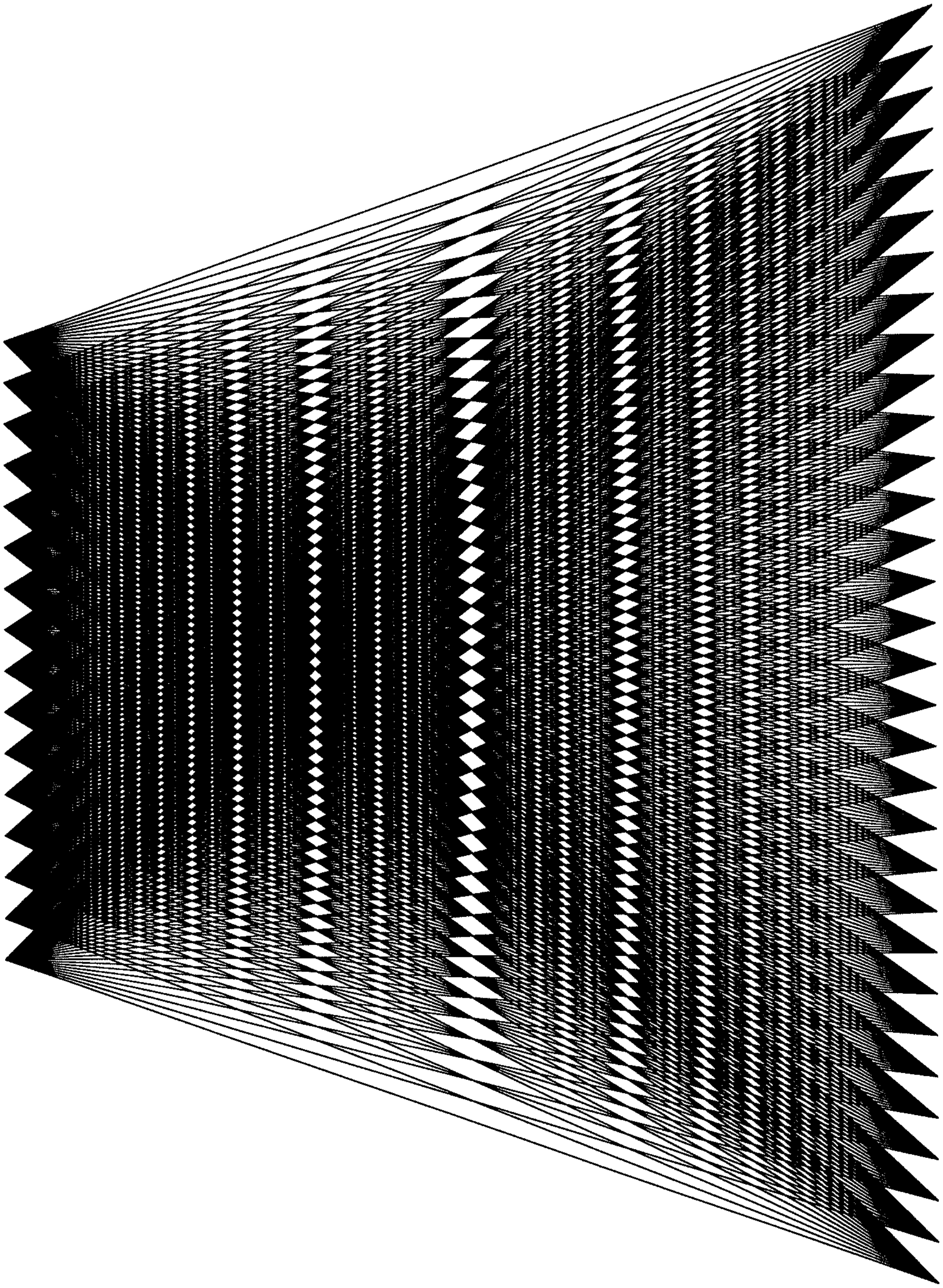
FIG. 2A shows a first example of two FCNs with a similar number of hosts, using different radixes and levels.
Figure 2B:
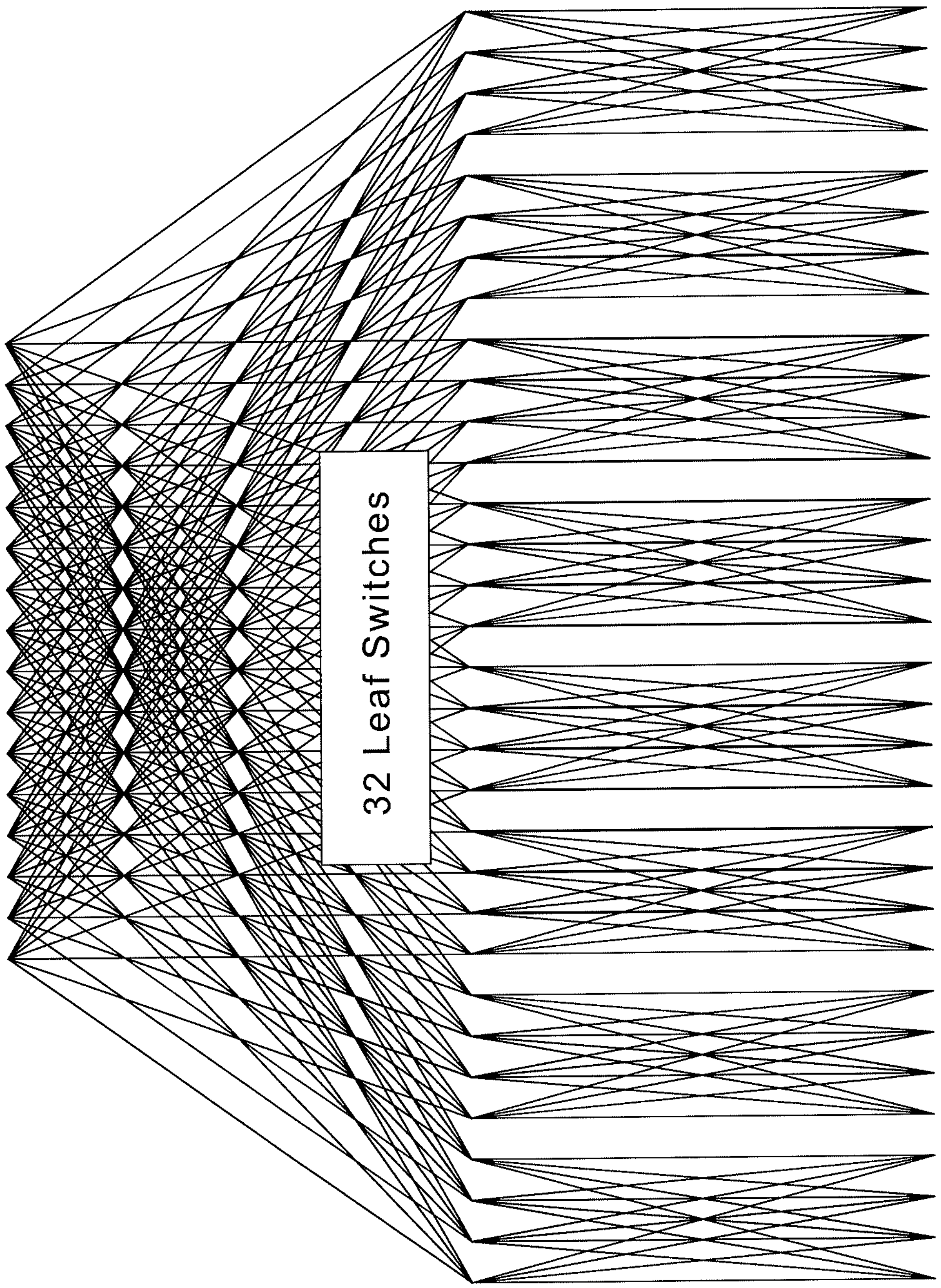
FIG. 2B shows a second example of two FCNs with a similar number of hosts using different radixes and levels.
Figure 3:
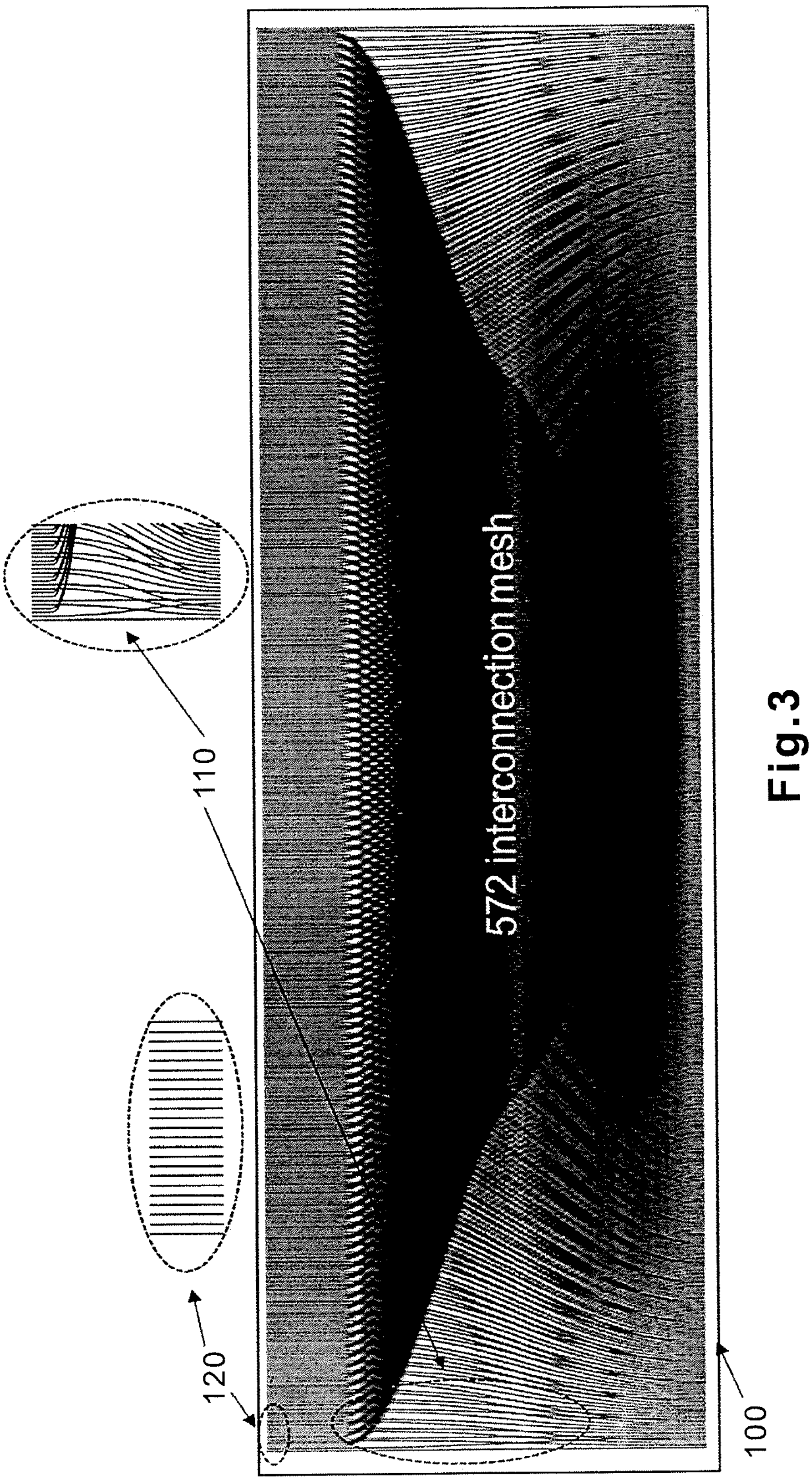
FIG. 3 shows interconnections of an example mesh that contains 576 interconnects (each with 12 or 8 fibers).

As shown in Tables III (FIG. 20), using two-layer networks, the network can be scaled to support thousands of Leaf switches that can interconnect 10s of thousands of servers. A method to scale beyond that number requires using a three-layer FCN. FIG. 1(*b*) shows a topology of a three-layer network with 16 Spine and 32 Leaf switches. In a three-layer network, the Spines do not need to be connected to all Leaf switches but to a group of them called PODs.

Module 400 can also be used to implement three-layer FCNs, as shown in FIGS. 15A and 15B. In this figure, a three-layer network with 1024 Spines (or 64 chassis with 16 linecards) and 2048 Leaf switches is shown. This network has 64 PODs, and each POD of the network has 32 fabric and Leaf switches. Each POD's mesh can be fully implemented with four stacked modules 400, as it was shown previously (see FIGS. 10A-D). Therefore, 64×4=256 modules are required to implement all the PODs. The connections between Spines and the 64 PODs require another set of 256 modules 400 since each Spine switch needs to connect only to one Leaf switch in the POD.

The interconnection method for the Leaf and Spine switches is shown in FIGS. 16A and 16B for the front side of the modules and 17 for the backside of the module. Following the method described above, the uplinks of the Leaf switches in each POD populate the modules horizontally. For example, in FIGS. 16A and 16B, four MPO uplinks of the first Leaf switch from POD 1, L1p1, occupy the first MPO ports of the first module 400. Four MPO uplinks of the Leaf switch 32 from POD 64, which are L32p64, occupy the last four MPO ports of the last module 400 in the stack.

From the opposite side of the stack, the columns of the module stack connect to the linecard MPO ports of the Spine switches. For example, as shown in FIGS. 17A and 17B, the linecard MPO ports of the Spine switch 1, S1c1, connect to eight MPO ports of the first column of the stack. The MPO ports of the second linecard of the same switch, S1c2, connect to eight MPO ports of the second column of the stack. The MPO ports of the 32nd linecard of the last Spine Switch, S32c16, connect to eight ports of the last column of the stack.

This three-layer fabric, with 1024 Spines (or 64 chassis with 16 linecards) and 2048 Leaf switches, requires 512 modules 400 with equivalent rack space equal to or smaller than 220 RU. The method to scale this network to a larger number of Leaf (and servers), the required number of modules 400, and rack space is shown in Table IV (FIG. 21).

As shown in this section, modules 400 and the disclosed method of interconnection for two and three-tier FCNs simplify the deployment of the optical networks of different sizes and configurations. The risk of interconnection errors during the deployment is highly reduced since the groups of cables representing uplinks/downlinks for the same switches are connected in close proximity, and also due to the high degree of mesh in the networks. For example, in FIGS. 16A and 16B, all Lipj connections, where i is the Leaf uplink index ranging from 1 to 4 and j the POD index ranging from 1 to 64, are interchangeable. During the network deployment, an unplanned change from L1p1 to L1p2, L1p1 to L1p3, L1p1 to L1p4, or in general any combination inside that group, will not have an impact on the network operation. The topology will still connect all the Leaf switches from the PODs to the Spine switches with the same number of paths and identical allocated bandwidth. Similarly, in FIGS. 17A and 17B, all the Spines columns are interchangeable, as can be derived from FIG. 10D. The level of redundancy provided by the stack of modules 400 highly reduces the risk of fabric failures or performance degradation caused by errors in the interconnection.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus having a plurality of multifiber connector interfaces wherein one or more of the multifiber connector interfaces are connectable to network equipment in a network using multifiber cables, the apparatus comprising an internal mesh implemented in two tiers, wherein the first tier is configured to re-order fiber groups of a respective multifiber connector and the second tier is configured to recombine individual fibers of different fiber groups, wherein a light path between transmitter and receiver multifiber connector interfaces is matched in order to provide optical connections from transmitting to receiving fibers.

2. The apparatus of claim 1, wherein the apparatus is further configured to be stacked to provide two-tier or three-tier CLOS network topology of various spine and leaf switch radixes.

3. The apparatus of claim 2, wherein the apparatus is further configured to enable networks with different levels of oversubscription from 1:1 to 1:12.

4. The apparatus of claim 1, wherein at least one of:

the apparatus is further configured to be used to scale optical networks from eight to a hundred thousand switches;

the apparatus is further configured to provide redundant paths for reducing the risk of network failure due to interconnection errors; or the apparatus is further configured to have a small form factor that enables stacking of three modules in one RU and/or that allows the stacking of up to 132 modules per rack.

5. The apparatus of claim 1, further comprising one or more external labels providing interconnection maps of the network to a portable device comprising a label reader when the external labels are read by said label reader, optionally wherein the label reader is a laser scanner or camera.

6. The apparatus claim 1, wherein the apparatus is further configured to distribute the traffic load of the switches efficiently.

7. The apparatus of claim 1, wherein at least one of:

the interconnection ports use multifiber connectors with 4 to 32 fibers; or the interconnection ports use multifiber connectors of different form factors, such as CS, SN, MPO, SN-MT, MMC.

* * * * *